Dec. 31, 1935.  A. F. HOWE  2,026,042
MACHINE FOR MANUFACTURING WOOD HEELS FOR SHOES
Filed May 19, 1933   13 Sheets-Sheet 1
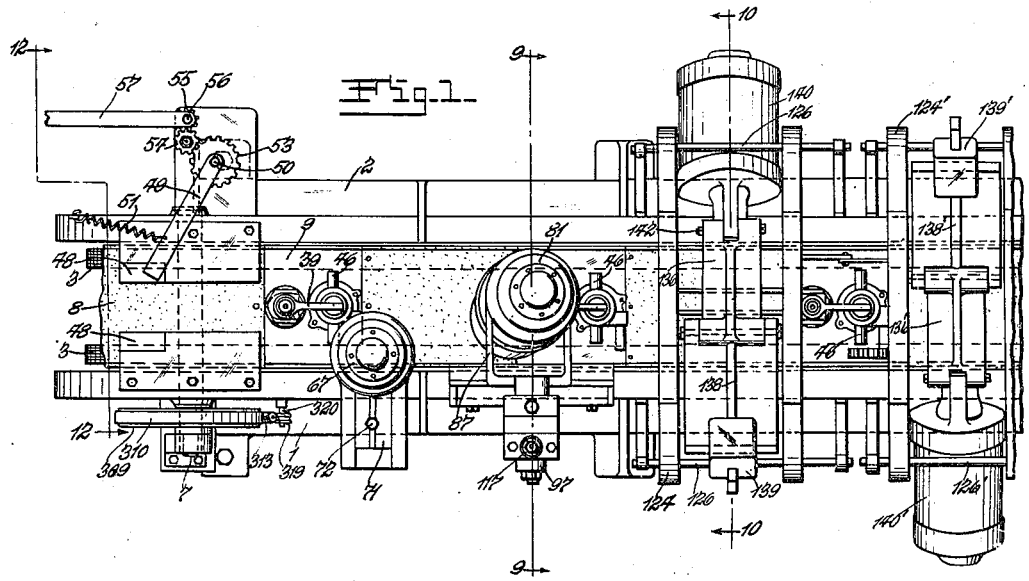
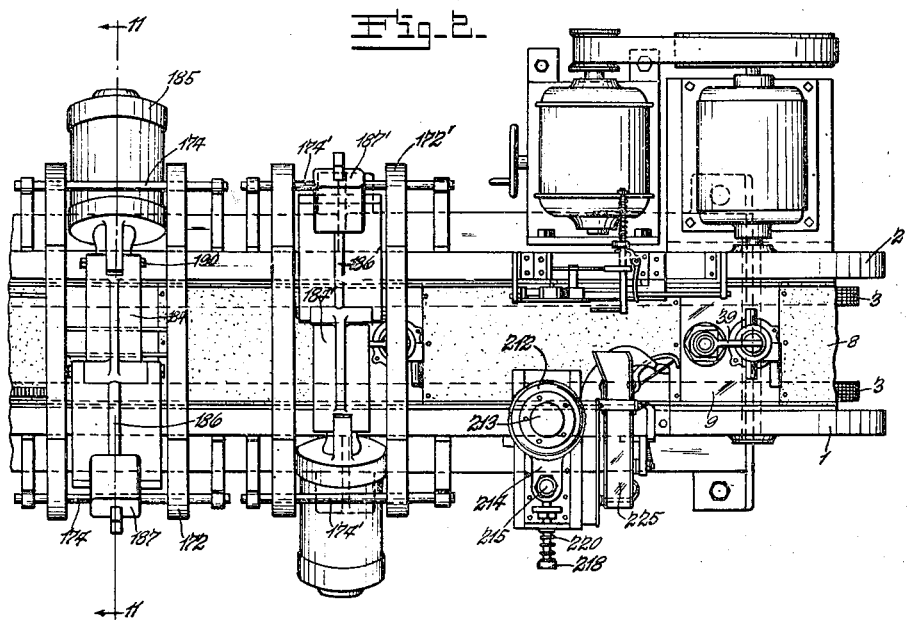

Dec. 31, 1935.  A. F. HOWE  2,026,042
MACHINE FOR MANUFACTURING WOOD HEELS FOR SHOES
Filed May 19, 1933    13 Sheets-Sheet 2
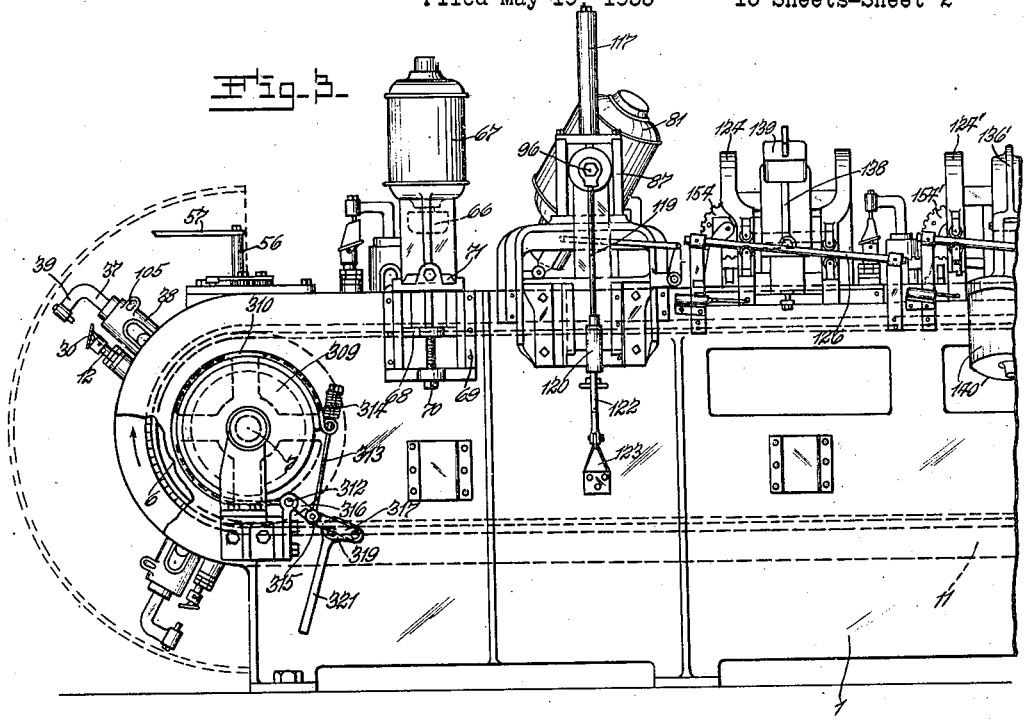
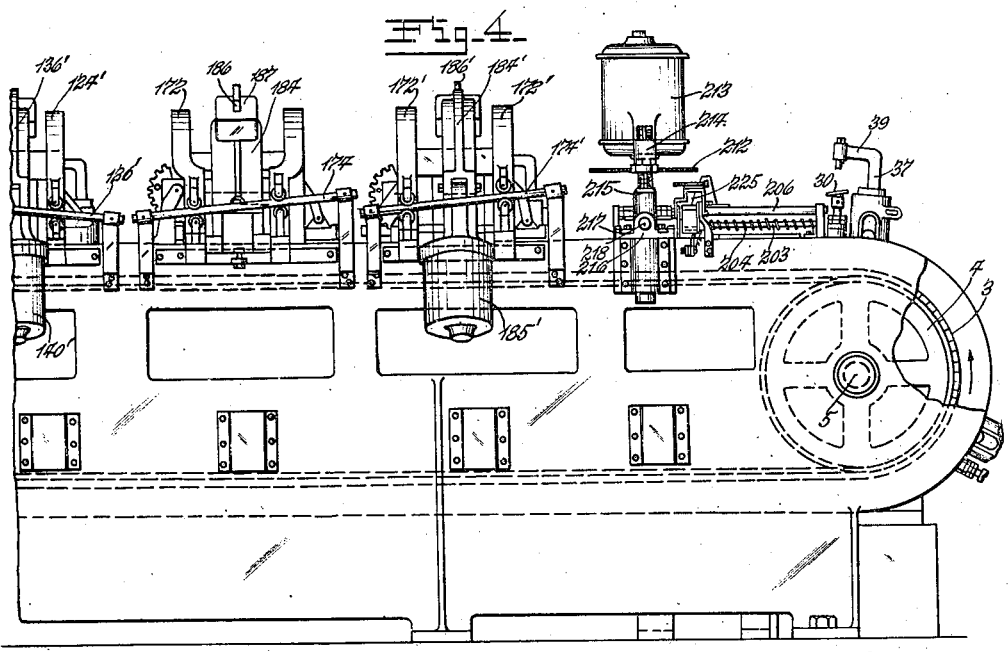
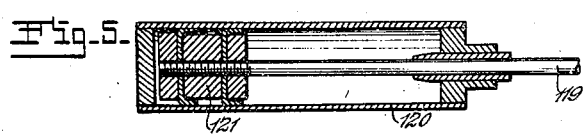

Dec. 31, 1935.  A. F. HOWE  2,026,042
MACHINE FOR MANUFACTURING WOOD HEELS FOR SHOES
Filed May 19, 1933  13 Sheets-Sheet 3
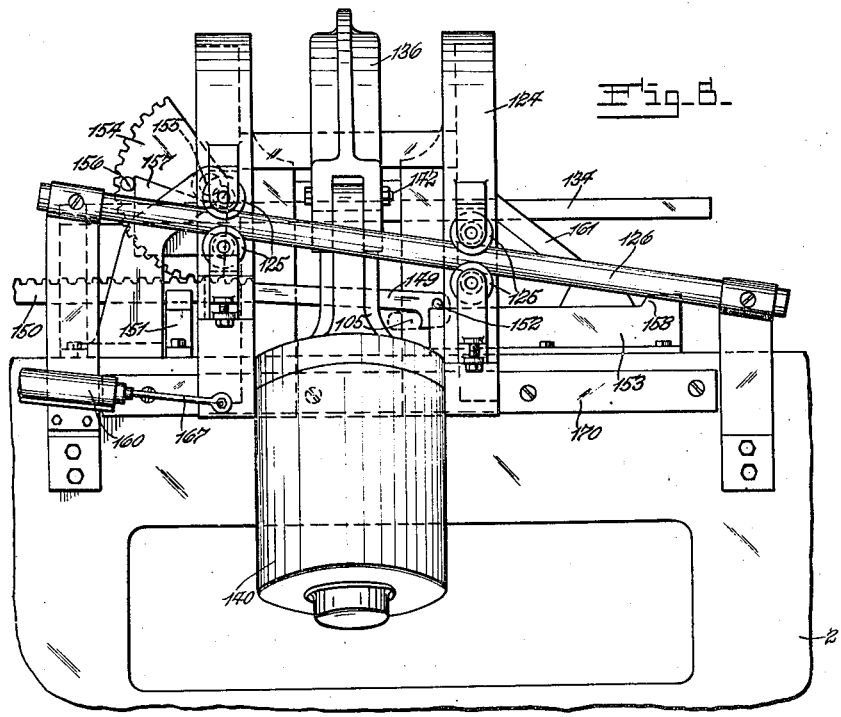
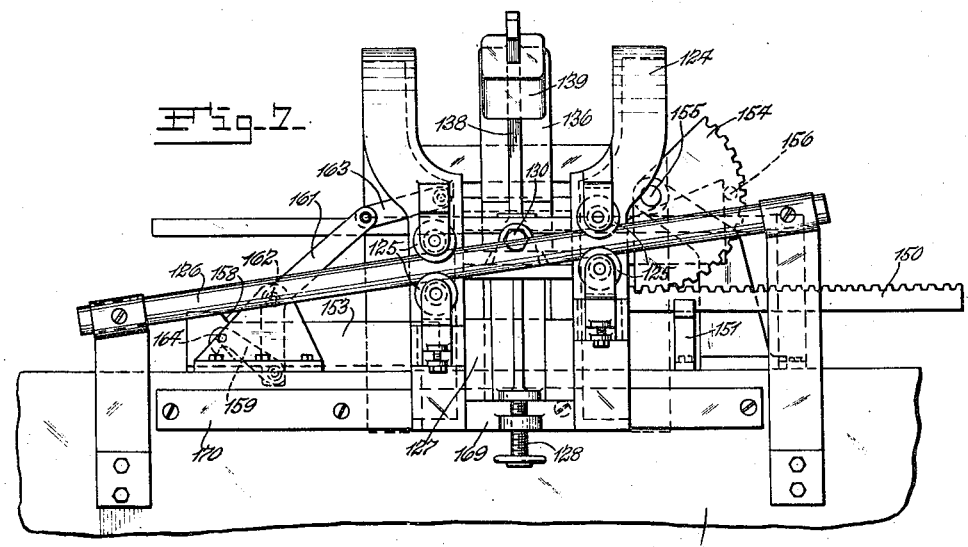
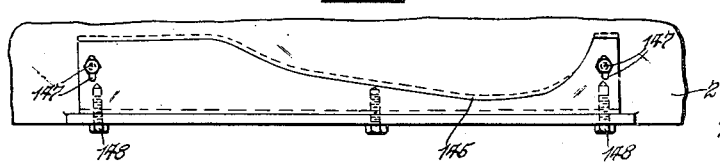
Inventor
Andrew F. Howe
by Trippey + Kingsland
His Attorneys

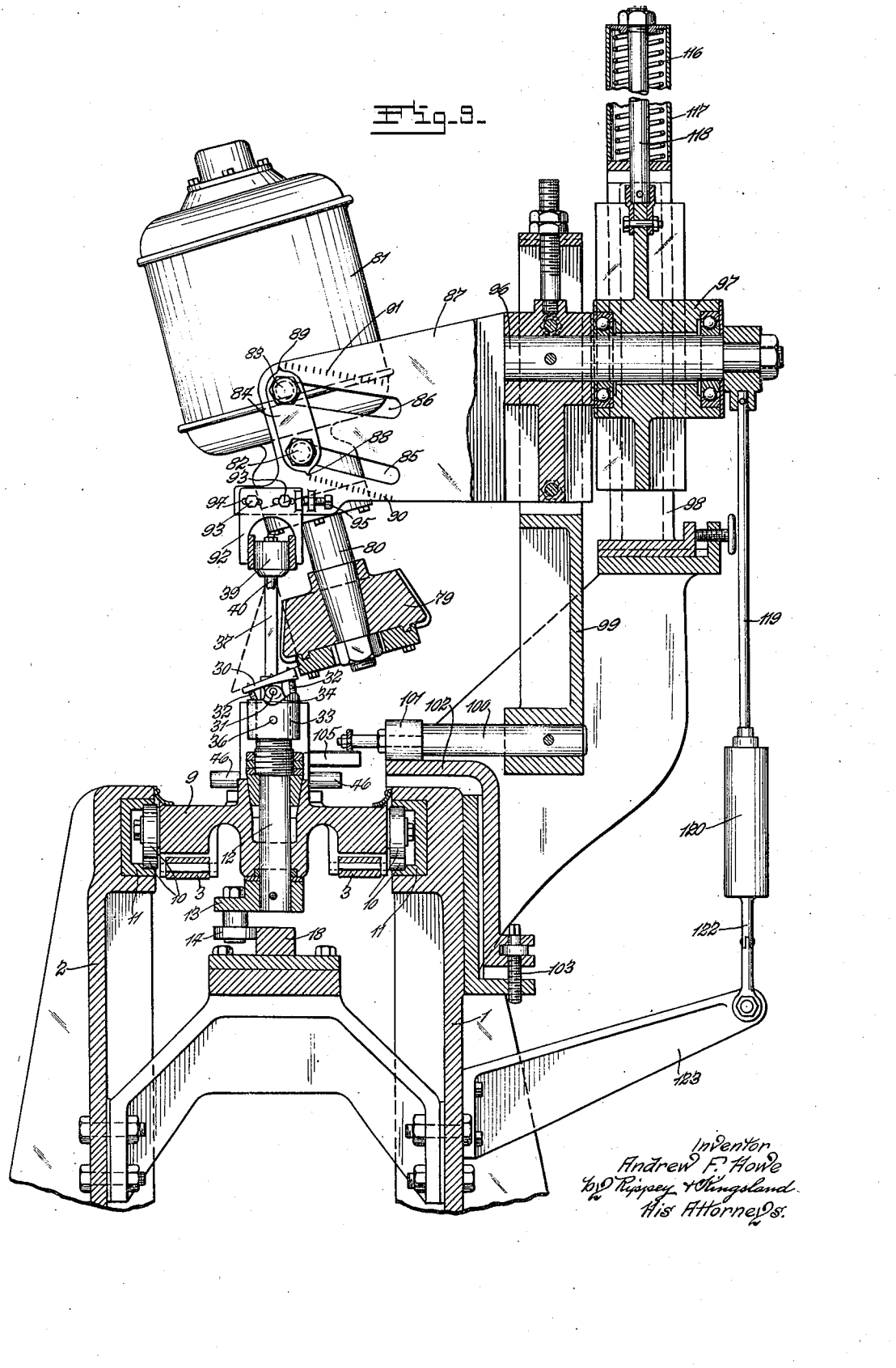

Dec. 31, 1935. A. F. HOWE 2,026,042
MACHINE FOR MANUFACTURING WOOD HEELS FOR SHOES
Filed May 19, 1933 13 Sheets-Sheet 5
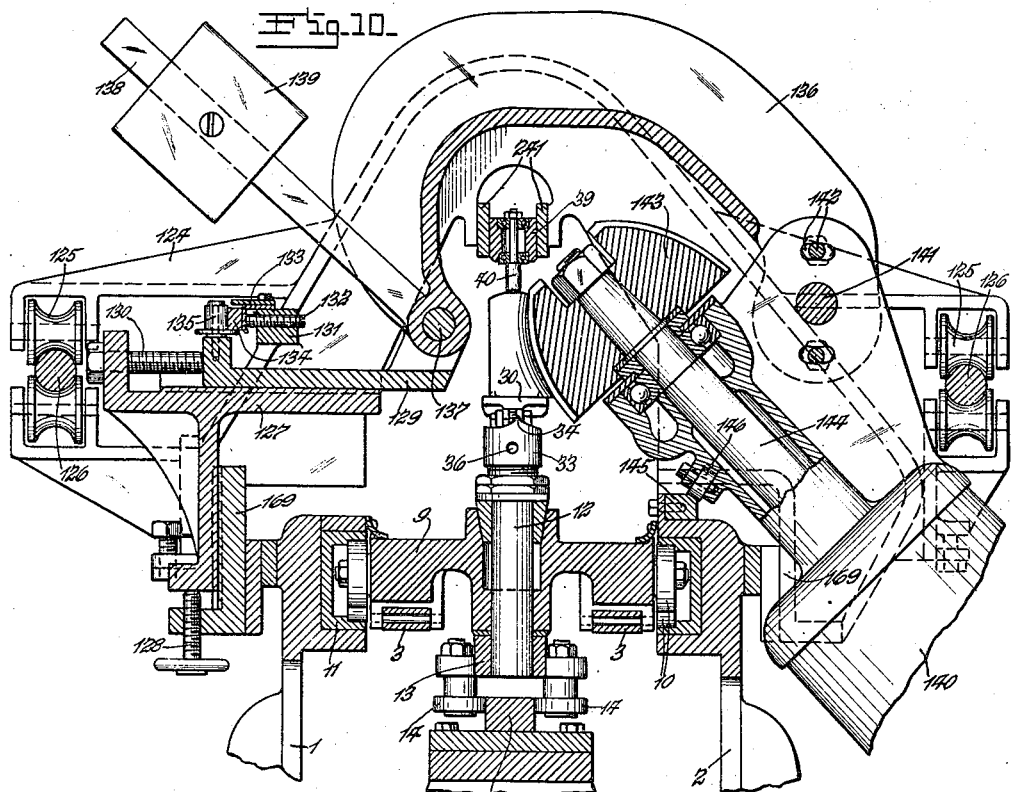
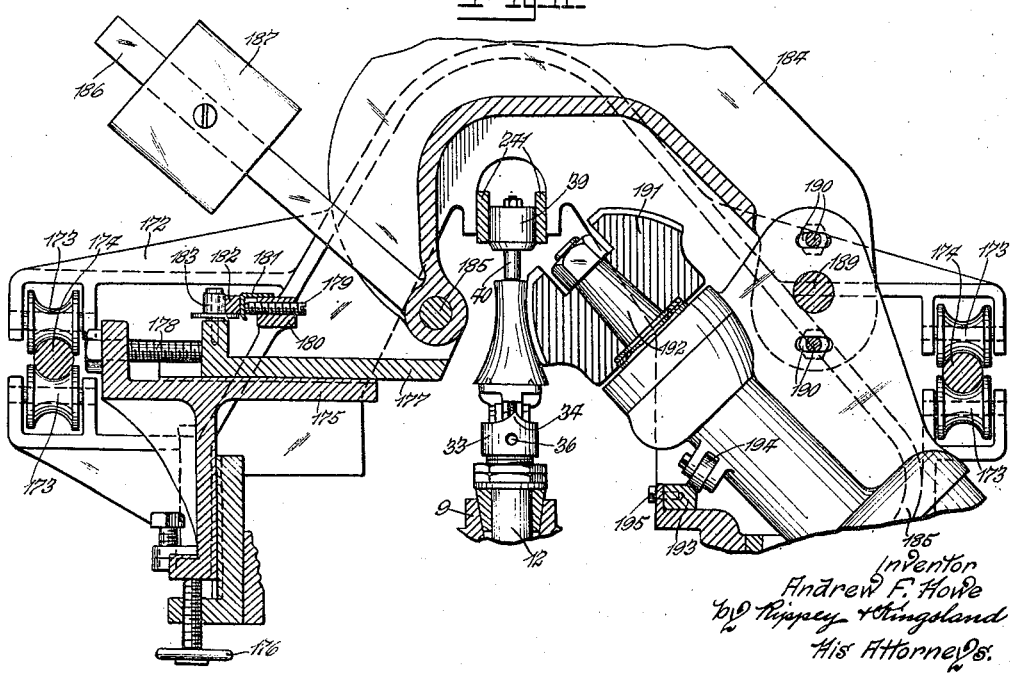

Dec. 31, 1935. A. F. HOWE 2,026,042
MACHINE FOR MANUFACTURING WOOD HEELS FOR SHOES
Filed May 19, 1933 13 Sheets-Sheet 6
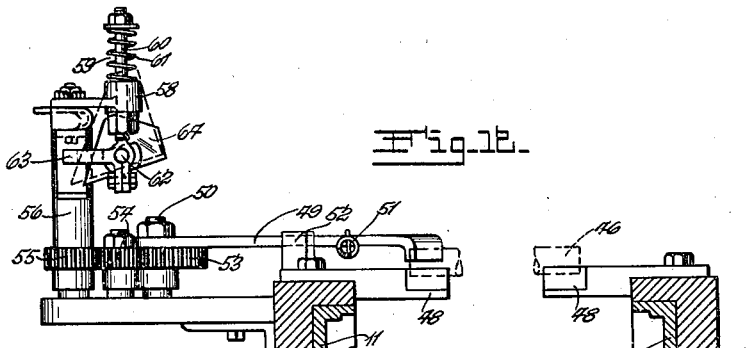
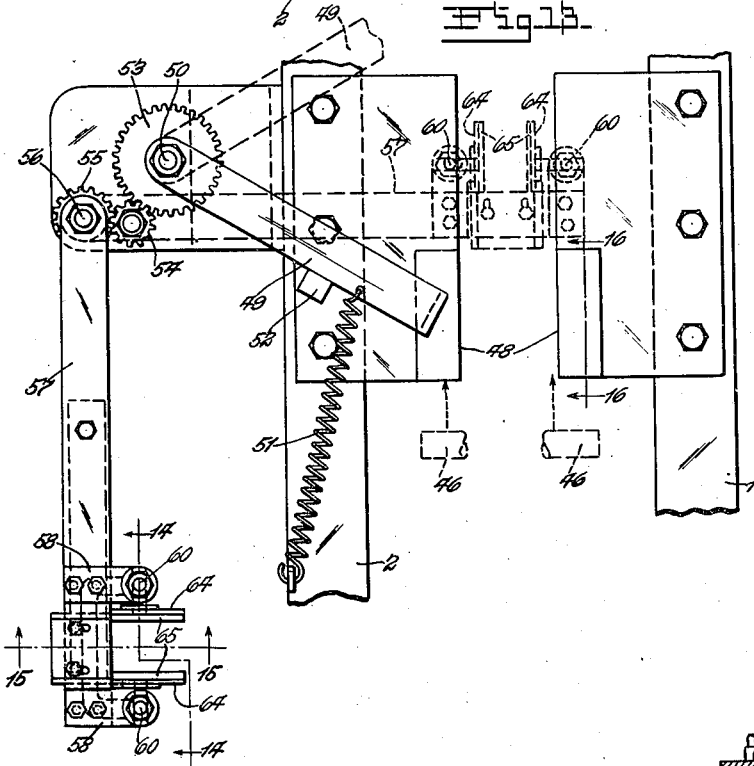
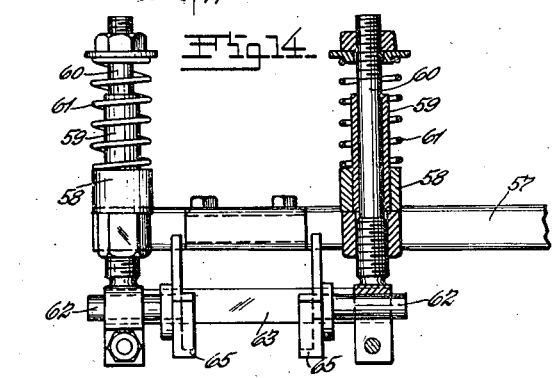
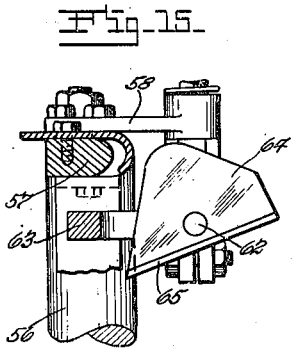

Dec. 31, 1935.  A. F. HOWE  2,026,042
MACHINE FOR MANUFACTURING WOOD HEELS FOR SHOES
Filed May 19, 1933    13 Sheets-Sheet 7
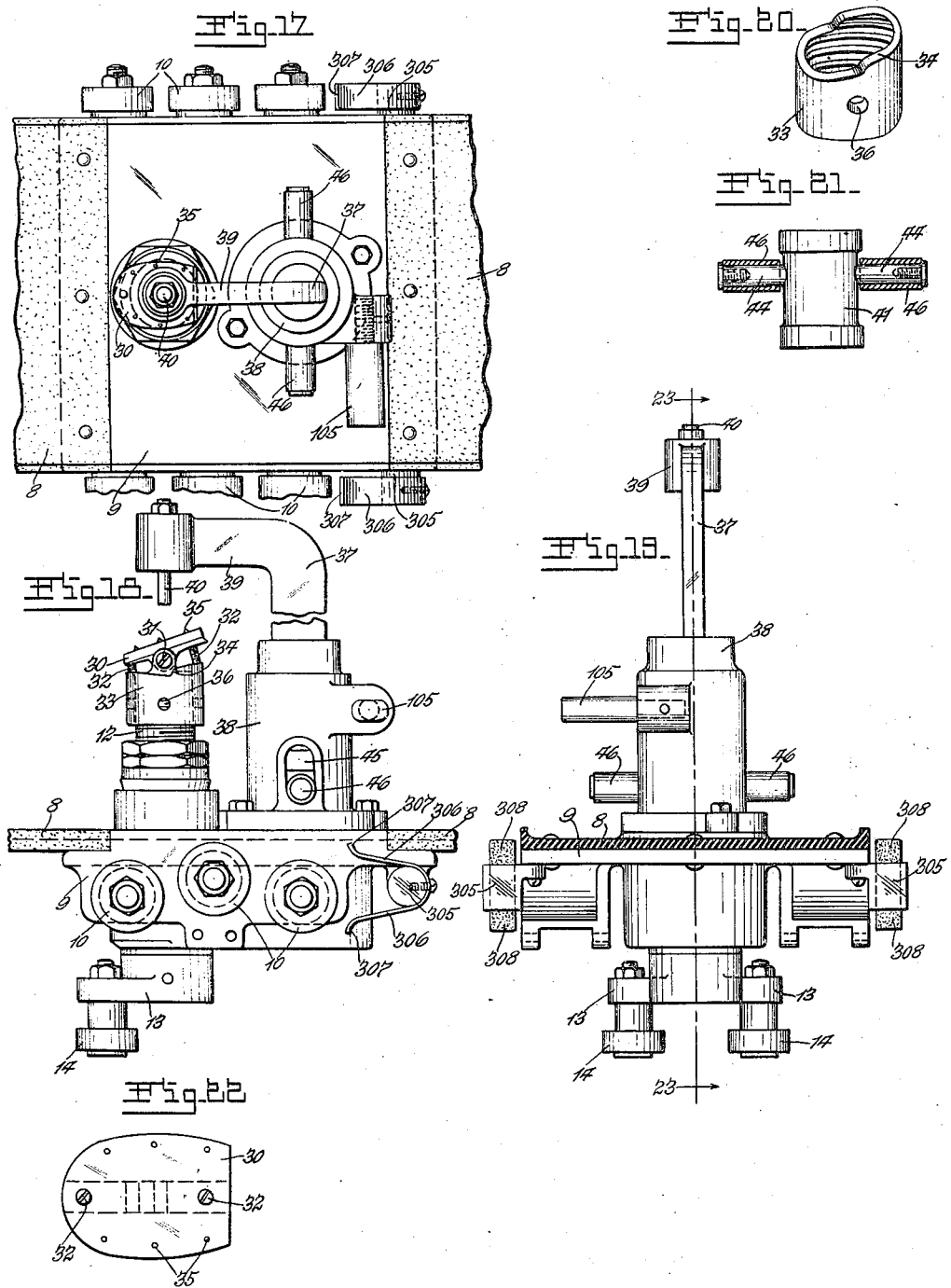

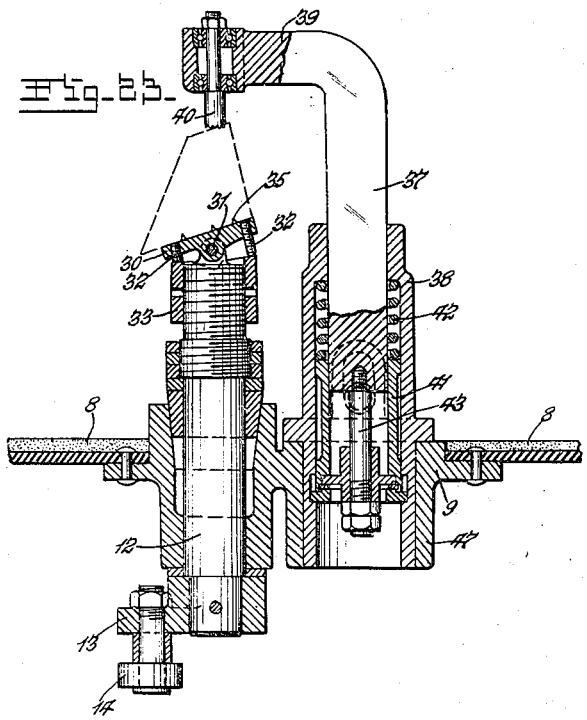

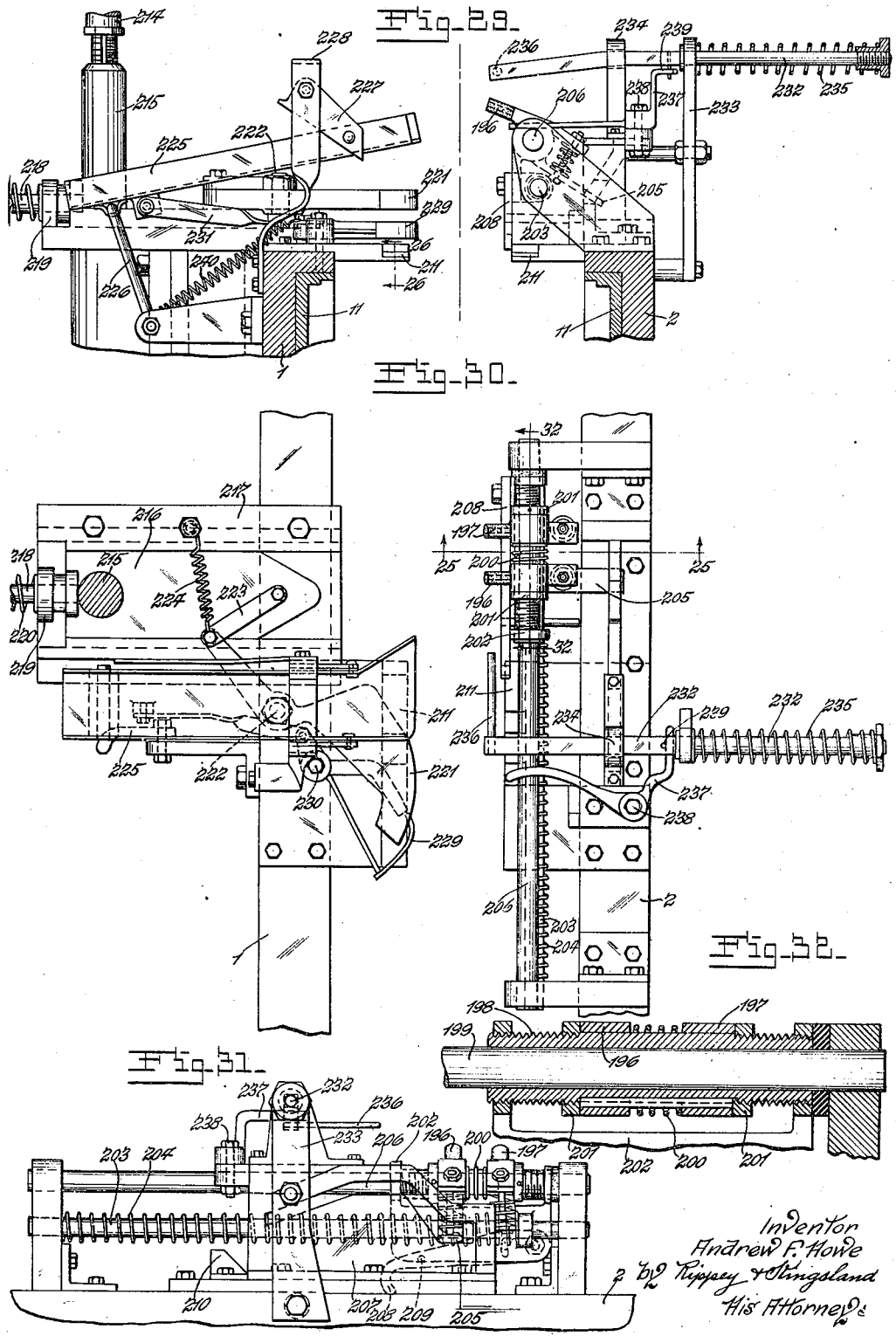

Dec. 31, 1935.   A. F. HOWE   2,026,042
MACHINE FOR MANUFACTURING WOOD HEELS FOR SHOES
Filed May 19, 1933   13 Sheets-Sheet 10
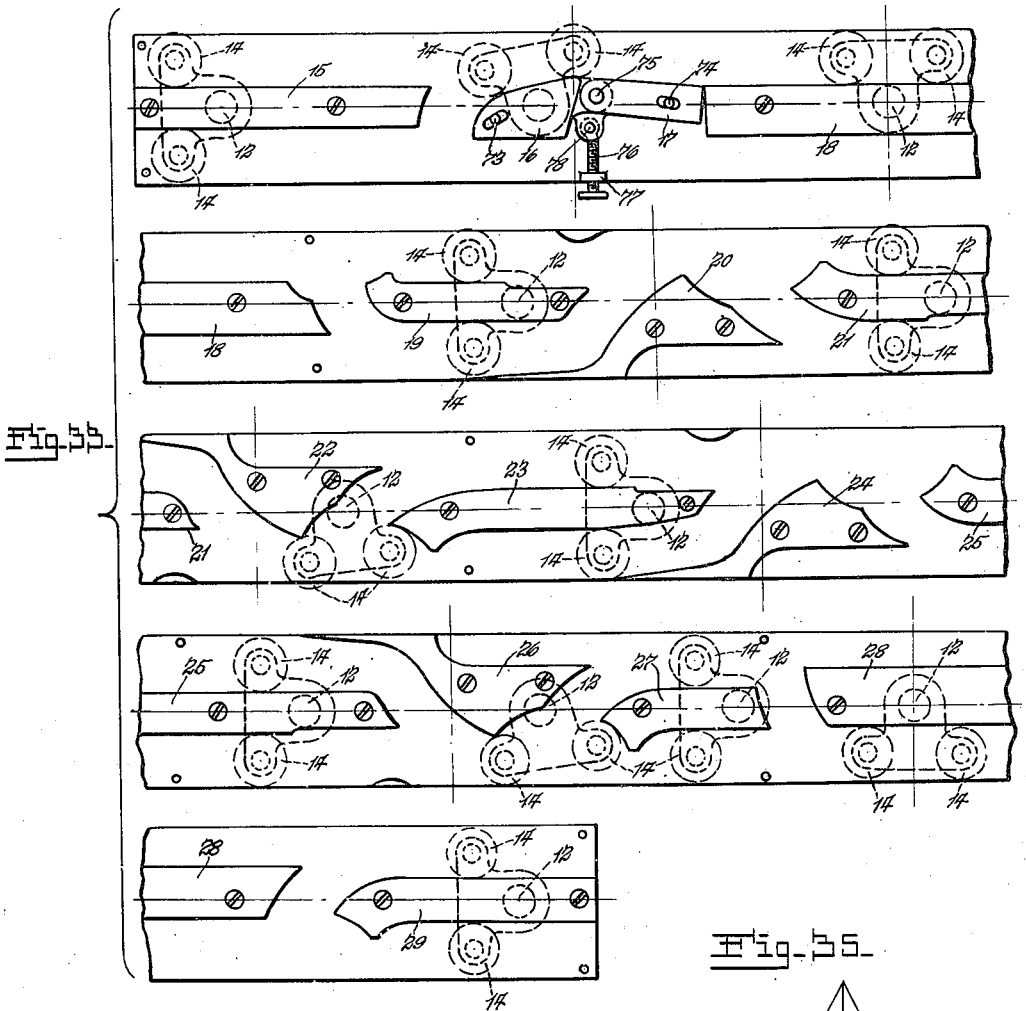
Fig. 33.
Fig. 35.
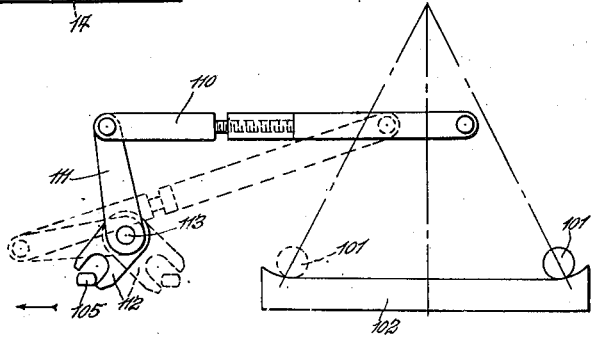
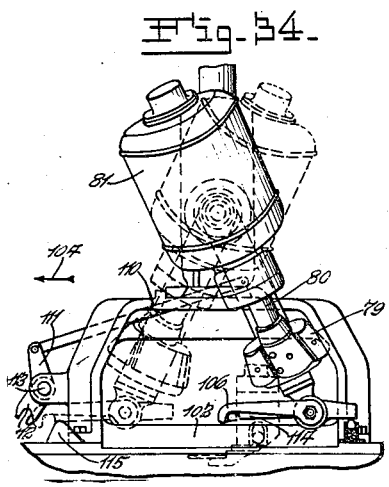
Fig. 34.
Inventor
Andrew F. Howe
by Rippey & Kingsland
His Attorneys Dec. 31, 1935.  A. F. HOWE  2,026,042
MACHINE FOR MANUFACTURING WOOD HEELS FOR SHOES
Filed May 19, 1933  13 Sheets-Sheet 11
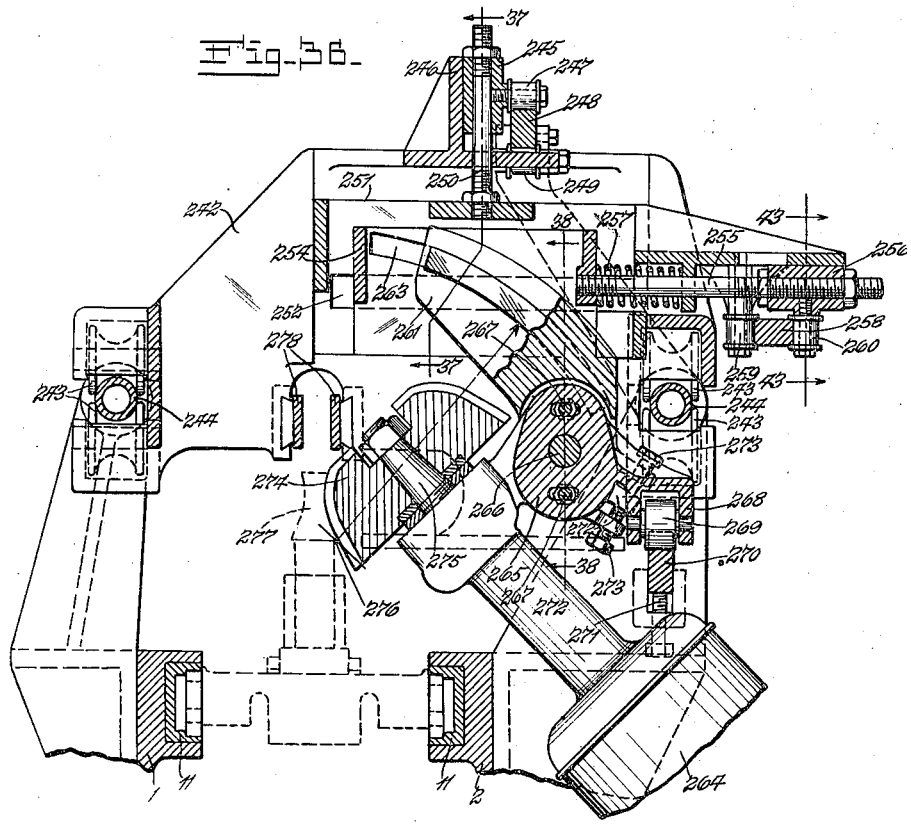

Dec. 31, 1935. A. F. HOWE 2,026,042
MACHINE FOR MANUFACTURING WOOD HEELS FOR SHOES
Filed May 19, 1933 13 Sheets-Sheet 12
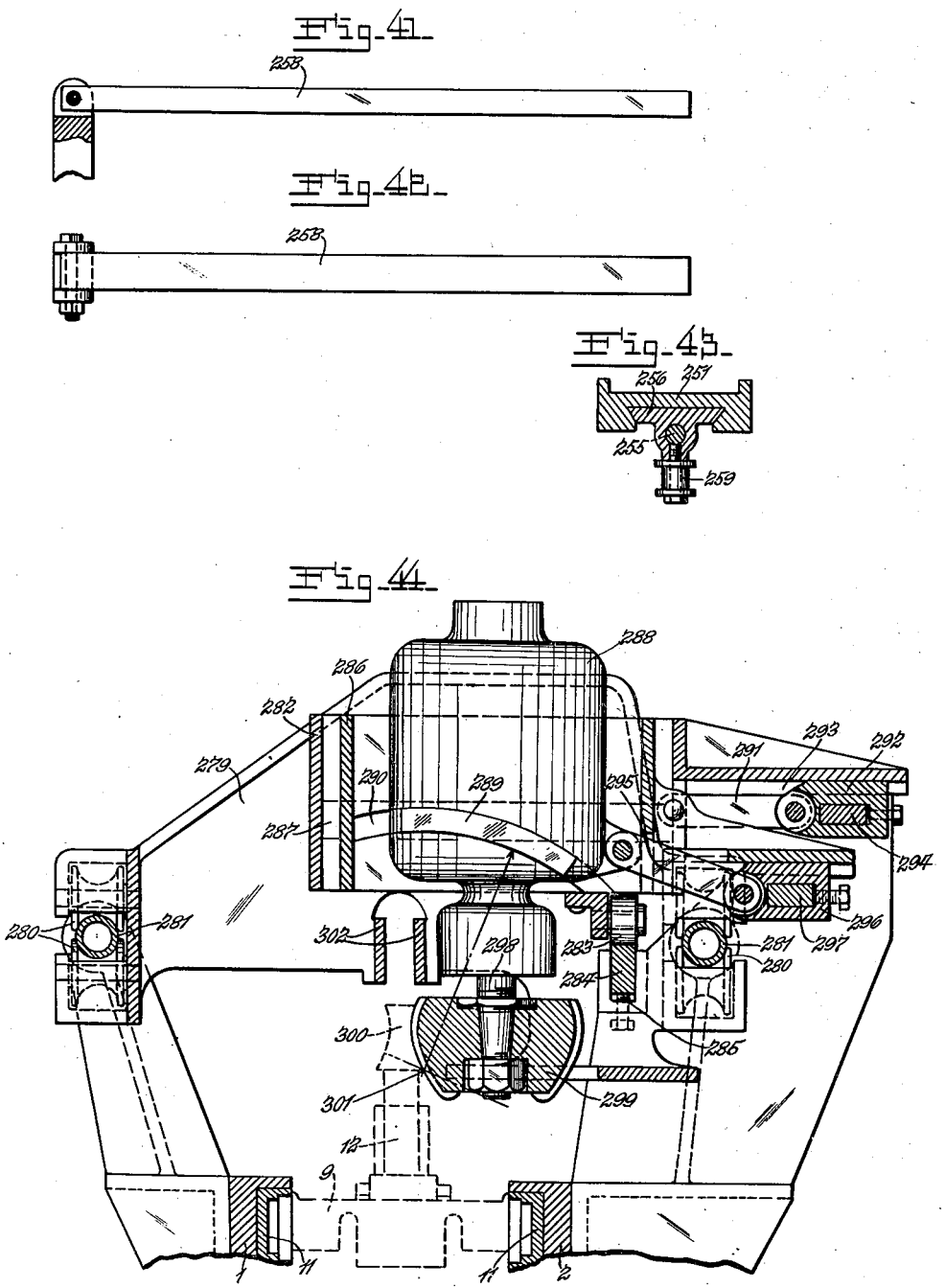

Dec. 31, 1935.  A. F. HOWE  2,026,042
MACHINE FOR MANUFACTURING WOOD HEELS FOR SHOES
Filed May 19, 1933  13 Sheets-Sheet 13
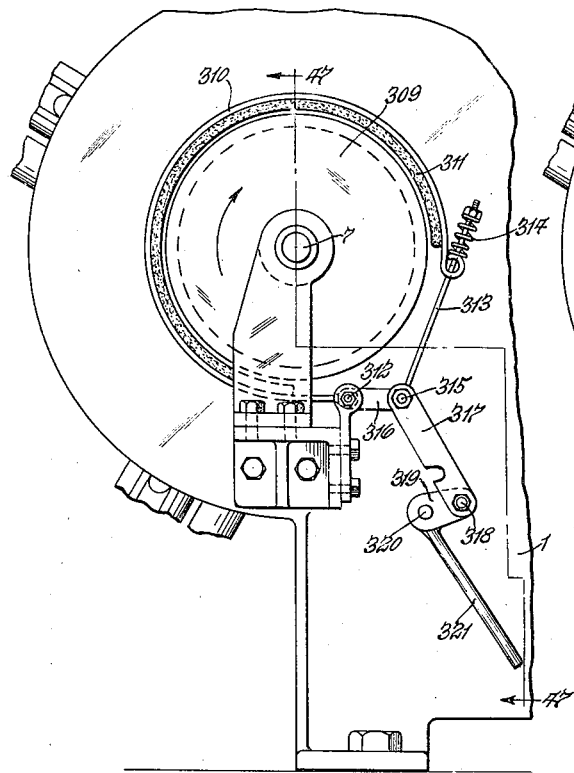
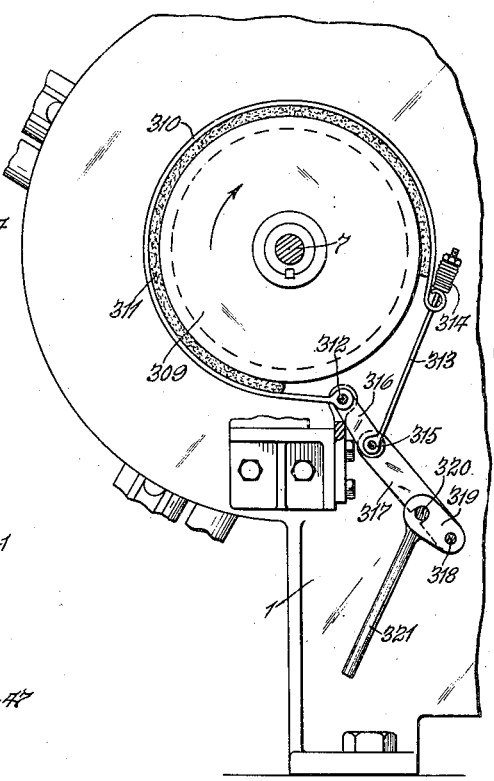
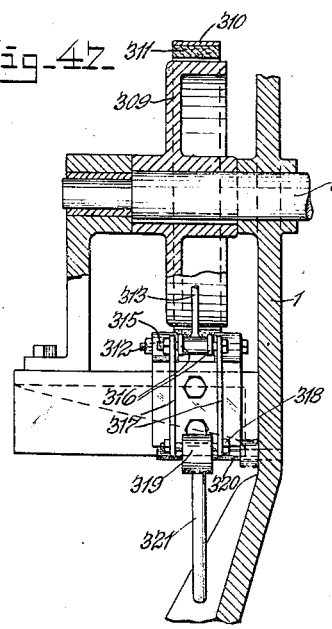
Inventor
Andrew F. Howe
by Rippey & Kingsland
His Attorneys Patented Dec. 31, 1935

2,026,042

UNITED STATES PATENT OFFICE 2,026,042

MACHINE FOR MANUFACTURING WOOD HEELS FOR SHOES

Andrew F. Howe, University City, Mo., assignor to United Wood Heel Company, St. Louis, Mo., a corporation of Delaware Application May 19, 1933, Serial No. 671,867

46 Claims. (Cl. 12—42)

This invention relates to machines for manufacturing wood heels for shoes, and has special reference to machines for cutting wood blanks to form finished breast walls and completely finished outer walls of wood heels during continuous movement of the jacks supporting the blanks as distinguished from intermittent starting and stopping operations and movements of the jacks.

Objects of the invention are to provide a machine for manufacturing and shaping wood heels from blanks by continuous operation and passage of the blanks through a single machine and subjecting the blanks to the successive operation of different cutting and shaping devices, whereby the breast walls of the heels are first formed and thereafter by successive operation of different cutting and shaping devices the curved outer walls of the heels are formed during movement of the latter cutting devices in accompaniment with the heel blanks in addition to the rotary operation of said cutting devices; to provide novel mechanism for moving the outer wall cutting and shaping devices along with the heel blanks during the movement of the latter through the machine as well as for operating the said cutting and shaping devices during such movement; to provide improved means for "spooling" the heel blank by rounding portions of the corners formed by intersection of the outer wall with the breast wall of the heel; and to provide means operating thereafter for severing the top end portions of the heel blanks and to discharge the approximately finished wood heels from their supporting jacks.

Another object of the invention is to provide a machine for manufacturing wood heels for shoes, including a jack for supporting a blank from which a wood heel is to be formed and automatic mechanism for placing a blank in connection with said jack and for clamping the blank therein and thereafter continuously operating cutting devices for cutting the breast wall of the heel and then continuously moving the blank in cooperative relation to a series of cutters, whereby the complete outer wall of a finished heel is formed.

Another object of the invention is to provide mechanism for moving a series of cutters from end to definite starting positions automatically and as an incident to movement of the heel blanks through the machine, so that said cutters while continuously rotating will maintain contact with the continuously moving heel blanks until they have completed their cutting operations on the heel blanks, thus avoiding the necessity of interrupting the forward movement of the heel blanks through the machine.

Another object of the invention is to provide a machine for forming wood heels for shoes including a series of continuously moving jacks for supporting heel blanks and a series of rotary cutters mounted in carriages and moving forwardly along with the jacks during their operation on the heel blanks supported by the respective blanks and then return to a definite starting position for subsequent similar operations.

Various other objects and advantages of my improved machine should be readily apparent from the following description, reference being made to the annexed drawings of an appropriate embodiment of the invention, in which—

Fig. 1 is a top plan view of the front end portion of the machine.

Fig. 2 is a top plan view of the rear end portion of the machine.

Fig. 3 is a side elevation of the front end portion of the machine.

Fig. 4 is a side elevation of the rear end portion of the machine.

Fig. 5 is a sectional view of one of the vacuum return devices associated with certain of the motor carriages.

Fig. 6 is a side elevation of one of the carriages supporting a cutter and operating motor therefor.

Fig. 7 is a view showing the opposite side of the mechanism from that shown in Fig. 6.

Fig. 8 is an elevation of a cam associated with the cutters that form the outer wall of the heel.

Fig. 9 is an enlarged vertical cross sectional view on the line 9—9 of Fig. 1.

Fig. 10 is an enlarged vertical cross sectional view on the line 10—10 of Fig. 1.

Fig. 11 is an enlarged vertical cross sectional view on the line 11—11 of Fig. 2.

Fig. 12 is a sectional view on the line 12—12 of Fig. 1, showing the loading mechanism for mounting the blanks on the jacks.

Fig. 13 is a plan view of the loading mechanism.

Fig. 14 is a vertical sectional view on the line 14—14 of Fig. 13.

Fig. 15 is a sectional view on the line 15—15 of Fig. 13.

Fig. 16 is a sectional view on the line 16—16 of Fig. 13.

Fig. 17 is a plan view of one of the jacks that support and move the blanks for operation of the cutters.

Fig. 18 is a side elevation of one of the jacks.

Fig. 19 is a front end elevation of one of the jacks.

Fig. 20 is a perspective view of the adjusting device whereby the jack is adjusted to support blanks of different types.

Fig. 21 is an elevation of one of the jack members apart from the associated elements.

Fig. 22 is a top plan view of an adjustable support included in each jack for supporting the heel blanks.

Fig. 23 is a vertical sectional view of one of the jacks on the line 23—23 of Fig. 19.

Fig. 24 is a sectional view showing a variation in the guiding device for the jacks.

Fig. 25 is a sectional view on the line 25—25 of Fig. 30, showing part of the devices for discharging the heels from the jacks.

Fig. 26 is a sectional view on the line 26—26 of Fig. 29.

Fig. 27 is a diagrammatic illustration of the mechanism for returning the cutter carriages to their starting positions.

Fig. 28 is a diagrammatic illustration of the operation of the heel and the cutter for the purpose of turning the heel.

Fig. 29 is a cross sectional view of the frame of the machine, showing in elevation elements for discharging the heel from the jack.

Fig. 30 is a plan view of the mechanism shown in Fig. 29.

Fig. 31 is a side elevation looking toward the right of Fig. 30.

Fig. 32 is a sectional view on the line 32—32 of Fig. 30.

Fig. 33 is a plan view of the cams whereby the jacks are operated to present different portions of the blanks to the cutters.

Fig. 34 is a view diagrammatically illustrating the swinging movements of one of the motors and the cutter driven thereby.

Fig. 35 is a view further diagrammatically illustrating these operations of the motor and cutter.

Fig. 36 is a view illustrating another form of cutter control whereby the cutters may be operated to form heels of different types.

Fig. 37 is a sectional view on the line 37—37 of Fig. 36.

Fig. 38 is a sectional view on the line 38—38 of Fig. 36.

Fig. 39 is a plan view of a part of the structure shown in Fig. 36.

Fig. 40 is a sectional view showing one of the guide bars or rails engaged by a roller to control operation of the cutter carriage.

Fig. 41 is a view showing a support for one of the guide bars or rails.

Fig. 42 is a plan view of one of the guide bars or rails, and the support for one end thereof.

Fig. 43 is a vertical sectional view on the line 43—43 of Fig. 36.

Fig. 44 is a sectional view similar to Fig. 36, showing a different arrangement of the motor and cutter in the supporting carriage therefor.

Fig. 45 is an enlarged view, in its unoperated position, of a device used to assure uniform uninterrupted movement of the jacks.

Fig. 46 is a similar view of said device in its operated position, a few of the parts being in section.

Fig. 47 is a sectional view on the line 47—47 of Fig. 45.

The invention may be applied to many uses. Only for convenience I have illustrated a specific embodiment and described an operation of a machine for making wood heels. It is clear enough that many inventions and features of invention embodied in my new machine may be used for other purposes than the manufacture of wood heels with little or no substantial variation. I consider broadly new an arrangement and cooperative relationship of the continuously moving jacks for supporting the work irrespective of whether the work is to be formed into a wood heel or some other object, in combination with one or more carriages for supporting a tool or tools for operating on the work and mechanism for moving said carriage or carriages from starting positions in accompaniment with the jacks and the work supported thereby and then returning the carriage or carriages to starting positions for subsequent operations, and causing the tool or tools to operate on the work during at least a portion of the movement of the carriage or carriages with the work. So, in describing the specific embodiment of the invention shown, no limitation is intended.

The machine in which the present invention is embodied is of that type disclosed in my application filed December 18, 1931, Serial No. 581,933. The machine includes a series of continuously moving jacks adapted to support and carry the blanks from which the wood heels are formed and to present the blanks to the cutters, which operate to cut the breast walls and the outer walls of the heels, and then to remove the top end portions of the heels. Certain of the cutters are mounted in movable carriages which are moved in cooperative relation to the jacks, so that, during the continuous movement of the jacks, the carriages in which the cutters are mounted are moved from and to starting positions. This makes it unnecessary to move the jacks intermittently since the cutters continue to operate during their movements in accompaniment with the jacks.

The present invention comprises a novel mechanism for controlling the cutters in such a way that wood heels of uniform structural configuration and shape are obtained.

The operating mechanism of the machine is supported by a pair of upright horizontally elongated side frames 1 and 2. A pair of endless conveyor chains 3 are mounted on and operated by wheels 4 attached to a rotary shaft 5 rotatively supported at one end of the machine and on wheels 6 mounted on a rotary shaft 7 supported at the opposite end of the machine. These chains support flexible sheets 8 which receive the shavings and waste material produced by operation of the cutters in forming the wood heels. Jack supporting plates 9 are also connected with and operated by the chains 3 (Figs. 9 and 10) and have rollers 10 operating against the upper and lower walls of channel rails 11. The ends of the sheets 8 are connected with the ends of the plates 9, so that the series of sheets 8 together with the series of plates 9 form an endless conveyor that receives the shavings and waste formed during the making of the wood heels and conveys the shavings and waste to and discharges the same at one end of the machine.

A jack shaft 12 is mounted for turning movements in each plate 9 and, considered in the positions they occupy when supporting the wood heel blanks for operation of the cutters, each shaft 12 has attached to its lower end two crank arms 13 supporting rollers 14. These rollers 14 successively engage the cams indicated by the reference numerals 15 to 29, inclusive, (Fig. 33) and thereby turn the respective shafts 12 as required to present different surfaces or portions of the wood heel blanks to the respective cutters during continuous movement of the jacks when the machine is in operation. The jacks do not operate intermittently but move continuously and certain of the operations of the cutters are synchronized with the operations of the jacks and the jack shafts 12, so that the cutters not only rotate continuously but also move from and to starting positions, the movements of said cutters from said positions being in accompaniment with the continuous movements of the jacks in order to permit the cutters to continue to operate on the wood heel blanks without intermittently stopping the jacks with the wood heel blanks therein for operation of the cutters on said blanks.

A plate 30 (Figs. 18, 22 and 23) is connected by a pivot 31 with the upper end of each jack shaft 12 and has an abutment 32 screwed in a hole therein at each side of the pivot 31 and adapted to engage against the upper end of an adjusting device 33 screwed on the upper portion of the shaft 12. The upper end of the adjusting device 33 is provided with a cam 34 (Fig. 20), so that, when said adjusting device is screwed along the shaft 12, it will vary the angle of inclination of the plate 30. Thus, the plate 30 may be adjusted and supported in different angles of inclination to support different types of wood heel blanks used for the manufacture of different types of wood heels, such, for instance, as Cuban heels or Louis heels, etc. The upper side of the plate 30 is provided with a number of rigid projections 35 that will penetrate the adjacent portion of the wood heel blank and hold the blank from twisting during the operation of the machine. The adjusting device 33 may be provided with construction 36 whereby an operating tool may be engaged with said device 33 to screw the same to different adjusted positions in connection with the shaft 12.

An angular jack member has an arm 37 mounted for sliding movements in a guide 38 rigid with each plate 9. The upper end of the arm 37 has a laterally extended arm 39 supporting a vertical clamping member 40 in axial alinement with the shaft 12. A sleeve 41 (Figs. 21 and 23) is mounted in each guide 38 and is actuated downwardly by a spring 42. A detachable connecting member 43 rigidly connects the lower end of the arm 37 with the lower end of the sleeve 41. Arms 44 project from diametrically opposite sides of the slots 41 through slots 45 in the guide 38 and support rollers 46. These arms 44 and rollers 46 constitute means for moving the jack arm 37 longitudinally in opposition to the spring 42 to open the jack for the reception of a wood heel blank and to discharge the finished heels. A support 47 in the guide 38 limits extent of downward movement of the sleeve 41 by the spring 42.

Near the front end of the machine, two cams 48 are rigidly attached to the frames 1 and 2 and are engaged by the rollers 46. As the rollers 46 operate along the cams 48, a sleeve 41 is thereby moved upwardly in opposition to the spring 42, thus moving the jack member 37—39 upwardly to permit a wood heel blank to be placed on the plate 30 below the clamping member 40. A wood heel blank is placed on the plate during continuous movement of the jack and is held thereon until the rollers 46 pass beyond the cams 48, at which time the spring 42 expands to push the jack member 37—39 downwardly by quick action, thereby quickly engaging the clamping member 40 against the top end of the heel blank and rigidly clamping the heel blank in position between the clamping member 40 and the plate 30.

*The loading mechanism*

An arm 49 is attached to an axle member 50 near the front end of the machine (Figs. 1, 12 and 13) and has its free end terminating above one of the cams 48, so that the roller 46 operating on said cam 48 will engage and move the arm 49. A spring 51, connecting the arm 49 with the frame 2, returns said arm 49 to its starting position in which said arm is stopped by an abutment 52. A gear 53 attached to the axle 50 meshes with a pinion 54, which is engaged with a pinion 55 attached to a rotary shaft 56. An arm 57 is attached to the upper end of the shaft 56 and supports the frame in which the heel blanks are placed and which is operated to place the heel blanks in the jacks above described. Said frame comprises two arms 58 attached to the arm 57 and supporting tubular guides 59 in which rods 60 are mounted for vertical sliding movements. Springs 61 yieldingly support the rods 60 in their upper positions. Two axially alined trunnions 62 are supported for turning movements by the lower ends of the rods 60. The lower ends of the rods 60 are connected by a frame member 63. The inner end of each trunnion 62 supports a plate 64 having along its lower edge an inwardly extended flange 65. These flanges 65 incline downwardly and outwardly and are designed and adapted to receive and support a wood heel blank. The angle of inclination from horizontal of the supporting flanges 65 is the same as the angle of inclination of the plate 30 and, since the angle of inclination of the plate 30 may be varied, it is also possible to vary the angle of inclination of the supporting flanges 65 and to adjust them in accordance with the requirements of the plate 30.

When the rollers 46 of any continuously moving jack move onto the cams 48, the jack member 37—39 is operated to move the clamp 40 to open position away from the plate 20. The cams 48 will hold the clamp 40 in this open position so long as the rollers 46 are on the cam members 48. During movement of the rollers 46 along the cam members 48, one of said rollers 46 engages and operates the arm 49, thereby quickly swinging the arm 57 inwardly to the dotted line position shown in Fig. 13, the flanges 65 passing at opposite sides of the plate 30 and placing the end of the wood heel blank on said plate 30 in engagement with the projections 35. Continued movement of the jack takes the rollers 46 beyond the cam members 48, at which time the spring 42 immediately expands to engage the clamping member 40 with the top end of the wood heel blank. About the same time, the roller 46 passes beyond and out of engagement with the arm 49, at which time the spring 51 acts to swing the arm 47 outwardly to its starting position to receive another wood heel blank. This operation is repeated when the next jack is opened by the rollers thereof passing onto and operating along the cams 48 and one of said rollers engaging and operating the arm 49.

During the time that the rollers 46 operate along the cam members 48, the rollers 14 are on opposite sides of the cam 15, the jack shaft 12 is held from rotating, and the jack member 37—39 is in advance of the jack shaft 12, so that the blank for the wood heel may be placed upon the inclined plate 30.

Cutting the breast walls of Cuban heels

When the rollers 14 pass beyond the cam 15, one of said rollers engages against the end of the cam 16 while the other roller 14 rolls along the cam 16. The continued movement of the jack causes that roller 14 that had engaged against the end of the cam 16 to pass through the space between the cams 15 and 16 to the opposite side of the cam 16, so that both of the rollers 14 are on the same side of the cam 16. This turns the jack shaft 12 about 90° and extends the upper end of the plate 30 toward the frame 1, causing the rotary cutter 66 (Fig. 3) to operate on the blank and form a part of the breast wall. The cutter 66 is operated by a motor 67 carried by a frame 68 rigidly supported for vertical adjustments in a guide 69 attached to the frame 1. The frame 68 is supported in any of its vertical adjustments by an adjustable support 70, consisting of a screw operative to raise and lower the frame 68 in the guide 69 and to support said frame 68 in any of its adjusted positions.

The support 71 for the motor 67 is mounted for inward and outward adjustments on the frame 68. This permits the motor 67 and the cutter 66 operated thereby to be moved inwardly to position for effective operation to cut blanks to form the entire breast walls of wood heels of the Cuban type; or said motor 67 and cutter 66 may be moved outwardly to adjusted position in which said cutter will cut the end walls a of Louis heels (Fig. 28). The support 71 may be rigidly held in its adjustment by a clamping set screw 72 operating through the support 71 to engage the frame 68 (Fig. 1).

The cam 16 is mounted on a pivot 73 (Fig. 33) and the cam 17 is mounted on a pivot 74. The adjacent ends of the cams 16 and 17 are connected by a pivot 75. The relative angles of inclination of these cams 16 and 17 may be varied by an adjusting device comprising a screw member 76 screwed through a rigid support 77 and having pivotal connection 78 with the cam 17. By varying the angular adjustments of the cams 16 and 17, the depth of the vertical groove in the breast walls of wood heels of the Cuban type may be increased or diminished as desired, thus permitting different forms and styles of breast walls to be formed on Cuban heels of different styles and shapes by merely adjusting the angular inclination of the cams 16 and 17.

Cutting the breast walls of Louis heels

The breast walls and forward extensions of wood heels of the Louis type are formed by a cutter 79 (Fig. 34) attached to a shaft 80 driven by a motor 81. The motor 81 is supported by clamping screws 82 and 83 (Fig. 9) passing through a gage indicator 84 and through slots 85 and 86, respectively, in a frame member 87. The slots 85 and 86 incline inwardly and upwardly from their outer ends and converge slightly toward their inner ends. Pointers 88 and 89 on the lower and upper ends of the indicator 84 cooperate with graduated scales 90 and 91, respectively, supported on the frame 87. In this way, the position and angle of inclination of the shaft 80 may be accurately determined and the adjustment of said shaft in its different operative positions may be accurately gaged and effected. By loosening the clamping screws 83, they may be moved along the slots 85 and 86 to any desired adjustments, the shaft 80 being moved from vertical to greater inclination inwardly and upwardly when said screws 82 and 83 are moved inwardly along the slots 85 and 86 from the outer ends of said slots. And when the screws 83 are moved toward the outer ends of said slots 85 and 86, the shaft 80 more closely approaches the vertical because of the spreading apart of said slots toward their outer ends. Different forms of breast walls of Louis heels may be made by this easy adjustment of the angle of inclination of the shaft 80 having the cutter tool 79 attached thereto. A single cutter tool, or form of cutter tool, will cut the various forms of breast walls of Louis heels, and there is no need to change the form of this cutter tool or substitute one for another.

A yoke 92 for engaging and guiding the forward extension 39 of the jack member 37—39 is adjustably supported by the frame 87. This yoke is supported by clamping screws 93 passing through slots 94 (Fig. 9) in the yoke 92 and engaging in the frame 87. Said yoke may be further held from lateral displacement by a screw 95 mounted in the frame 87 and engaging the yoke and being operative to adjust the yoke 92 to its proper lateral position. Then by tightening the set screws 93, the yoke will be securely held.

The frame 87 is attached to a rock shaft 96 supported for turning movements in a bearing 97. The bearing 97 is mounted for vertical sliding movements in a frame 98 adjustable on the side frame 1. An arm 99 is rigidly attached to the shaft 96 and has an inwardly extended rod 100 in connection with its lower end equipped with a roller 101. The roller 101 operates along a track 102 attached to the frame 1 by adjustable supports 103 whereby said track 102 may be raised or lowered, and supported in raised or lowered positions as desired. It is clear that, when the arm 99 is oscillated to operate the roller 101 along the track 102 from the solid line position (Fig. 34) to the dotted line position, the frame 87 will be raised and lowered and that the cutter 79 will also be raised and lowered. The starting position of the cutter 79 is shown in Fig. 34, which illustrates the parts as seen by persons standing at the frame 2 and facing the motor 81. Looking at Fig. 34, the jacks travel in the direction of the arrows 104. Each jack has projecting therefrom a rigid arm 105 which, during the movement of the jack, engages a hook 106 pivoted on the inner end of the rod 100. The moving jack thereby oscillates the arm 99, which first raises and then permits the cutter 79 to descend.

By adjusting the track 102 vertically and varying the adjustment of the arm 99 in connection with the frame 87, the radius of curvature of the surface of the forwardly extended portion of a Louis heel may be varied as desired. Thus, Louis heels with breast walls of varying shapes and forms and with forwardly extended portions of varying dimensions may be easily made by this machine.

During this movement of the jack in accompaniment with the swinging cutter 79, the rollers 14 operate against the same side of the cam 18, which is the side toward the frame 2 (Figs. 9 and 33), thus holding the high end of the inclined plate 30 toward but below the cutter 79. This rise and descent of the cutters 79 during continuous and rapid rotation thereof cuts the breast wall 107 (Fig. 28) of the Louis heel and produces the downwardly curved wall 108 on the forward extension of the end of the heel forming the heel seat. This downwardly curved wall 118 consists of an infinite number of adjacent arcs extending parallel from each other from the forward edge 109 of the wall 108 to merge with the transverse breast wall 107. The proper curvature of this wall 108 is obtained by the raising and lowering of the cutter 109 during the time that said cutter is operating to cut the breast wall 107 and the infinite number of curved lines forming the wall 108.

A link 110 has one end pivoted to the frame of the motor 81 and the opposite end pivoted to the upper end 111 of a lever 112 mounted on a pivot 113 supported by the frame 98.

Fig. 35 diagrammatically illustrates the swinging of the cutter 79, and the operation of the roller 101 along the track 102, and the operation of the lever 112 by the link 110. During the final swinging movement of the cutter 79 from solid line to dotted line position (Fig. 34), the hook 106 is raised out of engagement with the projection 105 by a cam 114 on the hook 106 riding on a raised part 115 on the frame. Thereupon the projection 105 engages and swings the lever 112 from dotted line to solid line position (Fig. 35) and thus quickly swinging the cutter 79 back to its initial position, which is the solid line position shown in Fig. 34.

Oscillating movements of the cutter 79 by the arm 99 are cushioned and in part controlled by devices to prevent undesired vibration and oscillation of these parts. A spring 116 (Fig. 9) is seated upon the upper end of the frame 98 and is enclosed in a cylinder 117, the upper end wall of which seats on the spring. A rod 118 connected with the bearing 97 extends upwardly through the upper end of the frame 98 and axially through the spring 116 and through the upper end wall of the cylinder 117. This spring functions to cushion the vertical movements of the bearing 97 and minimize vibration of said bearing.

A rod 119 has its upper end pivotally connected with the shaft 96 and its lower end extending into a cylinder 120 and connected with a piston 121 mounted for sliding movements in said cylinder. The lower end of the cylinder 120 is attached to the upper end of the rod 122, the lower end of which is pivoted to an arm 123 rigid with the frame 1. The piston 121 and the cylinder 120 function as a pneumatic or hydraulic device, somewhat in the nature of a dash-pot to cushion and control the rocking movements of the shaft 96.

About the time that the wood heel blank is carried beyond the cutter 79, which is about the time that the projection 75 engages and operates the lever 112 to swing said cutter 79 back to its starting position, the rollers 14 pass beyond the cam 18. The roller 14 that is in advance engages the adjacent end of the cam 19, causing the other roller 14 which is at the rear to pass through the space between the adjacent ends of the cams 18 and 19 to the opposite side of the cam 19, as should be understood by reference to Fig. 23.

If desired, adjustable cams, like the cams 16 and 17 with their sliding mountings 73 and 74, pivotal connection 75 and adjusting device 76 mounted in a support 77 and having a pivotal connection 78 with one of these cams, may be substituted for the cam 18. Thus, when the cams 16 and 17 substituted for the cam 18 are adjusted to angular relationship, the breast wall 107 of the heel will be curved instead of being cut straight across. Consequently I may form the breast walls of Louis heels either straight across the front of the heel or with grooves of any desired depth merely by substituting cams 16 and 17 with their adjustment device for the cam 18.

Cutting the heel blank to form the curved outer wall

After passing from the cutter 79, the wood heel blank is subjected to the cutting action successively of two duplicate cutters. These two duplicate cutters are mounted in independently operative and relatively movable carriages and said carriages are moved from and to starting positions by devices under control of the respective jacks. Each of these duplicate cutters operates to cut the wood heel blank to form approximately one-half of the outer wall of the finished heel, the cutting action of each of these two duplicate cutters beginning at the breast wall 107 and running around to or slightly beyond the central line at the rear of the outer wall of the heel in a symmetrical and predetermined relationship with respect to the axis of the shaft 12. In fact all of the walls formed by the cutters or tools of the present invention are located and formed in definite and symmetrical relationship with respect to the axis of said shaft 12. First, after leaving the cutter 79, one side and a portion of the rear of the wood heel blank are presented to the cutting action of one of these two duplicate cutters. The wood heel blank then moves beyond the said one cutter and the opposite side and adjacent portion of the rear are presented to the other duplicate cutter, which begins cutting at the breast wall 107 and cuts symmetrically with the cut that was formed by the first cutter to intersection with the wall formed by the first cutter, forming a complete smooth outer wall that is continuous from the breast wall along the sides and rear of the heel and extending to both ends of the blank.

Since the equipment and parts of the second of these two cutters are the analogues of the equipment and parts of the first cutter, the equipment and parts of the second cutter have the same reference numerals applied thereto as are applied to the equipment and parts of the first cutter, being distinguished by the application of an exponent to the reference numerals applied to the equipment and parts of the second cutter. A single illustration will suffice. The first cutter is mounted in a carriage 124 while the second cutter is mounted in a carriage 124'. The carriage 124 extends transversely above the frames 1 and 2 (Fig. 10) and is supported and guided by spaced pairs of rollers 125 supported by said carriage engaging above and below inclined rails 126 inclining downwardly toward the rear end of the machine. A support 127 is mounted in the carriage 124 and is vertically adjustable by a screw support 128 mounted in the lower part of the carriage 124 and supporting the support in any of its vertical positions. A member 129 is mounted on the support 127 and is adjustable inwardly and outwardly. An abutment screw 130 mounted in the support 127 will hold the member 129 from outward movement in any of the adjusted positions of said member 129. A connecting member 131 rigid with the carriage 124 supports a screw 132 having its outer end engaging a flexible shoe 133 attached to said connecting member 131 and contacting with the inner side of a rail 134. A roller 135 supported by the member 129 engages the outer side of said rail 134, so that said rail extends between the shoe 133 and the roller 135. The rail 134 is free to move inwardly and outwardly in accordance with the inward and outward adjustment of the member 129 on the support 127, these parts functioning to hold the support 129 fixed in any of its adjustments on the support 127.

A support 136 has one end mounted on a pivot 137 carried by the member 129 and supporting an arm 138 provided with a counter-balance weight 139 for the purpose of partially counter-balancing the equipment mounted on the opposite end of said support 136. The frame of a motor 140 is mounted on a pivot 141 supported by the free end of the support 136, extent of swinging movements of said motor frame about said pivot 141 being limited by pin and slot structure 142. A cutter 143 is attached to the motor driven shaft 144 and is operative to cut the heel blank to form the outer wall along one side and around a part of the rear. A cam 145 (Figs. 8 and 10) is attached to the frame 2 for the motor 140 and to the frame 1 for the motor 140', and a roller 146 supported by the frame of the motor 140 operates along this cam 145 and controls the swinging of the motor frame about the pivot 141. These cams 145 and 145' are adjustable on their supports by clamping screw and slot devices 147 and retaining screws 148. These cams 145 and 145' may be adjusted in coordination with the adjustment of the members 129 and 129' by means of the adjusting devices described for holding the members 129 and 129' in different adjusted positions. Or these cams 145 and 145' may be adjusted independently of the members 129 and 129' in order to vary the configuration and form of the heels by varying the inclination of the axis of the cutters. It should be clear by reference to Fig. 10 of the drawings that inward or outward adjustment of the cam 145 will vary the inclination of the axis of the shaft 144, which is the axis of the cutter 143 and will thereby cause the cutter to produce heels of various designs, shapes, curvature and cubic volume. These adjusting devices for varying the positions and inclinations of the cutters constitute a highly important feature of the present invention.

When the rollers 14 leave the cam 18, one of said rollers 14 passes between the ends of the cams 18 and 19 to the opposite side of the cam 19, so that the rollers 14 roll along opposite sides of said cam 19. As the rollers 14 approach the ends of the cam 19, the projection 105 on the jack engages a hook 149 (Fig. 6) on a sliding rack 150. One end of the rack 150 is mounted on a support 151 and the opposite end of said rack has a pin 152 resting on a cam member 153. When the projection 105 engages the hook 149, the rack 150 is thereby moved longitudinally along with the jack. The rack 150 meshes with a segmental rack 154 pivoted on a stationary axis 155 and thereby turns said rack 154 about said axis 155. A projection 156 rigid with the rack 154 engages an abutment 157 rigid with the carriage 124 and thereby moves said carriage 124 along the rails 126 in accompaniment with the movement of the jack by which the rack 150 is moved.

It should be clear by reference to Figs. 6 and 7 that the initial portion of the movement of the carriage 124 by the jack mechanism is at a slower speed than the movement of the jack mechanism because the first movement of the projection 156 includes a sliding movement against the abutment 157. Therefore, there is no quick or sudden jerk or jar nor too great impact on placing of the load consisting of the carriage 124 upon or against the jack mechanism. The resistance and load of the carriage 124 is thus minimized by the sliding action of the pin 156 against the abutment 157.

About this time the roller 14 that had passed between the cams 18 and 19 operates against the cam 20 and passes between the cams 19 and 20, thus turning the jack shaft 12 and thereby turning the wood heel blank with respect to the cutter 143, causing said cutter 143 to cut said blank and form the outer wall of the heel along one side and across a portion of the rear of the blank. The roller 14 that passes between the cams 19 and 20 is advanced to the front of the other roller and passes beyond the apex of the cam 20. As the following roller 14 passes toward the apex of the cam 20, the roller 14 that is in advance is caused to pass between the cams 20 and 21 to the opposite side of the cam 21, while the second or following roller 14 remains on that side of the cam 21 corresponding to the sides of the cams 18 and 19 along which it had operated.

This occurs after the hook 149 on the rack 150 has been released from the projection 105. Said hook 149 is released from said projection 105 by the projection 152 riding upon a raised portion 158 of the cam member 153. When the hook 149 is thus released from the projection 105, the carriage 124 is returned to its starting point.

After the hook 149 is disengaged from the projection 105, the carriage 124 is returned to its starting position while the rollers 14 are operating along opposite sides of the cam 21. A hook 159 (Figs. 7 and 27) is supported by a pivot 160 attached to the lower end of a lever 161. The lever 161 is mounted on a pivot 162 and has its upper end pivoted to one end of a link 163, the opposite end of which is pivoted to the carriage 124. A lateral projection 164 on the hook 159 rides along a surface 165 and supports the hook 159 in position to be engaged by one of the rollers 46 after the projection 105 has been disengaged by the hook 149. Continued movement of the jack, which has one of its parts 46 engaging the hook 159, imparts a quick swinging movement to the lever 161, thereby quickly moving the carriage 124 to its starting position. As the carriage 124 approaches its starting position, the projection 164 operates against a cam 166 and disengages the hook 159 from the part 46, permitting the jack to continue to travel while the carriage 124 remains in its starting position. Movement of the carriage 124 to its starting position causes the part 157 by cam action against the projection 156 to turn the segmental rack 154 to its starting position and thereby move the rack 150 and the hook 149 to their starting positions ready for the hook 149 to be engaged by the projection 105 on the next following jack.

Movement and operation of the carriage 124 is controlled in part and cushioned by a pneumatic or hydraulic device, similar to that shown in Fig. 5, and comprising a rod 167 (Fig. 6) pivoted to the carriage 124 and operating through one end of a cylinder 168 and connected with a piston in said cylinder, similar to the piston 121. This pneumatic or hydraulic device functions effectively to hold the carriage 124 in its starting position notwithstanding the inclination of the rails 126.

After the carriage 124 has been returned to its starting position, the carriage 124' with cutter mechanism mounted therein is operated in the same way as the carriage 124, said carriage 124' being moved along the rails 126' from and to its starting position by analogues of the devices described for moving the carriage 124 from and to its starting position by the jack which presents a wood heel blank to the cutter 143 and to a similar cutter in the carriage 124'. The cutter in the carriage 124' is at the opposite side of the machine from the cutter 143 and operates on the opposite side of the wood heel blank to finish the outer wall of the heel around the sides and to the rear of the heel preparatory for operation of the spooling cutters to which the heel is next presented.

Side members 169 of the carriage 124 operate against guides 170 attached to the frames 1 and 2 of the machine and thus cooperate with the rails 126 to prevent improper vibration and oscillation of the carriage 124 and function to guide said carriage in its reciprocating movements free from undesired oscillation and vibration.

After leaving the cutter 143, the wood heel blank is shifted and presented for operation of the cutter in the carriage 124'. This shifting is effected by passing one of the rollers 14 through the space between the cams 21 and 22 to the high point of the cam 22 (Fig. 33), the roller in advance passing against the end of the cam 23 and again turning the jack shaft 12, and causing the other roller 14 to pass through the space between the cams 22 and 23 to the opposite side of the cam 23. During these turning movements of the jack shaft 12, the carriage 124' is moved along with the jack, causing the cutter in said carriage to operate to complete the symmetrical formation of the outer wall of the heel blank that had been begun by the cutter 143, leaving only the spooling operations to be performed by two cutters provided for that purpose.

The action of each of the cutters or tools 143 or 143' to form the outer wall of the heel may be called a reverse spiral movement. This is because the cutting action of these cutters or tools begins at the breast wall 107 of the heel blank and passes downwardly along a spiral toward the rear of the heel blank and thence upwardly along a spiral about the rear of the heel blank. These actions and operations of the cutters or tools 143 and 143' are caused by the control of said cutters or tools by the cams 145 and by the inclination of the rails 126 and the other cooperating devices that have been described for varying the angles of inclination of the axes of the cutters or tools.

The jacks may be arranged at different distances apart in order that no two jacks will be engaged with any of the tool carriages at the same time and assuring that only one carriage will be engaged with a jack at any one time, thereby minimizing the load upon the jack conveyor. This applies to the carriages 124 and 124' and also to the carriages for spooling the heel which I now proceed to describe.

Spooling the heel

After passing from the cutter 143', the wood heel blank is subjected to the cutting action successively of two duplicate cutters to "spool" the heel blank by rounding portions of the corners formed by intersection of the outer wall with the breast wall of the heel. These two duplicate cutters are mounted in independently operative and relatively movable carriages and said carriages are moved from and to starting positions by devices under control of or cooperatively associated with the respective jacks. Each of these duplicate cutters operates to perform a spooling operation by rounding one of the corners at the intersection of the outer wall with the breast wall of the heel, the cutting action of each of these two duplicate cutters beginning at the breast wall 107 and curving therefrom to form a spool surface 171 merging with or intersecting the curved outer wall. The curved spool wall surface 171 formed at each side of the heel, in the operation of the machine shown, extends from the top end of the heel and narrows gradually to final disappearance a distance from the opposite end of the heel. First, after leaving the cutter 143' and returning to its starting point the carriage 124', one portion of the wood heel is presented to the cutting action of one of these two duplicate cutters to form one of the surfaces 171, and then the wood heel moves beyond the said one cutter and the opposite side of the wood heel is presented to the other duplicate cutter which forms the other surface 171 symmetrically with respect to the surface 171 that is first formed.

Since the equipment and parts of the second of these two duplicate spooling cutters are the analogues of the equipment and parts of the first cutter, the equipment and parts of the second cutter have the same reference numerals applied thereto as are applied to the equipment and parts of the first cutter, being distinguished by the application of an exponent to the reference numerals applied to the equipment and parts of the second cutter. A single illustration should suffice. The first spooling cutter is mounted in a carriage 172 while the second cutter is mounted in a carriage 172'. The carriage 172 extends transversely above the frames 1 and 2 (Fig. 11) and is supported and guided by spaced pairs of rollers 173 engaging opposite sides of rails 174 inclining upwardly toward the rear end of the machine. A support 175 is mounted in the carriage 172 for vertical adjustments by a screw 176. A member 177 is mounted and is adjustable inwardly and outwardly on the support 175. A set screw 178 mounted in the support 175 cooperates with other parts, comprising a set screw 179 mounted in a part 180 of the carriage 172, and presses a flexible shoe 181 against one side of a rail 182 against which a roller 183 mounted on the member 177 operates. The rail 182 is free to move inwardly and outwardly in accordance with the inward and outward adjustment of the member 177, these parts functioning to hold the support 177 fixed in any of its adjustments on the support 175.

A support 184 has one end mounted on a pivot 185 and supporting an arm 186 equipped with a counter-balance weight 187 for the purpose of partially counterbalancing the equipment mounted on the opposite end of said support 184. The frame of a motor 188 is mounted on a pivot 189 supported by the free end of the support 184 that is limited in its swinging movements by pin and slot devices 190. A cutter 191 is attached to the motor driven shaft 192 and is operative to cut the heel blank to form the spool surface 171. A cam 193, like the cam 145, is attached to the frame 2 for the motor 188 and to the frame 1 for the motor 188', and a roller 194 supported by the frame of the motor 188 operates along this cam 193 and controls the swinging of the motor about the pivot 189. These cams 193 and 193' are adjustable on their supports by setting and holding screws 195 and may be adjusted in coordination with the adjustment of the members 175 and 177. Or these cams 193 and 193' may be adjusted independently of the members 175 and 177, or vice versa, in order to vary the configuration and form of the heel by varying the inclination of the axis of the cutters and thereby varying the form and area of the wall surfaces 171. It should be clear by reference to Fig. 11 that inward or outward adjustment of the cam 193 will vary the inclination of the axis of the shaft 192, which is the axis of the cutter 191 and will thereby cause the cutter to produce heels of various designs, shapes, curvature and cubic volume. These adjusting devices for varying the positions and inclinations of these cutters constitute highly important features of the present invention.

During the movement of the rollers 14 along the cam 23, one of the rollers passes through the space between the cams 23 and 24, thereby turning the shaft 12 to turn a corner of the heel blank for the spooling action of the cutter 191.

As already described, the cutters or tools 143 and 143' begin cutting at the breast wall of the heel blank and cut rearwardly therefrom along the sides and around a portion of the rear first along descending spiral lines and then along ascending spiral lines. In contrast with the cutting actions of the cutters or tools 143 and 143', the cutter 191 and its analogue cut forwardly toward the breast wall of the heel in order to form the perfect spool surfaces 171, which merge in curvature with the curvature of the remaining outer wall surface of the heel.

The carriage 172 also supports operating equipment to be engaged by the rigid jack arm 105. This operating equipment is the same as that shown and described in connection with the carriage 124 and comprises a hook 149 on a rack 150 mounted on a support 151, a pin 152 riding on a cam member 153, a segmental rack 154 pivoted on a stationary axis 155 and a projection 156 rigid with the rack 154 engaging the abutment 157 and thereby moving the carriage 172 along the rails 174 in accompaniment with the movement of the jack by which the rack 150 is moved. This equipment is mounted in cooperative relation to the carriage 172 in the same manner that the analogue of this equipment is mounted in cooperative relation to the carriage 124, which is sufficiently illustrated in Figs. 6 and 7, making it unnecessary to duplicate such illustration of these parts applied to the carriage 172. The hook 149 controlling the carriage 172 is released from the rigid jack arm 105 by a raised portion 158.

The roller 14 that had passed between the cams 23 and 24 then passes to the opposite side of the cam 25 while the following roller remains on the same side of the cam 25. During the final portion of the travel of the jack along the cam 25, the carriage 172 is returned to its starting position by an analogue of the equipment that returns the carriage 124 to its starting positions, comprising a hook 159 mounted on a pivot 160 supported by a lever 161 carried by a pivot 162 and connected with one end of a link 163, the opposite end of which is connected with the carriage 172. These devices are operated by one of the jack parts 146 engaging the hook 159 and thereby quickly returning the carriage 172 to its starting position during continued forward movement of the jack. The hook 159 is released from the jack member 146 by the pin 164 riding upon a cam 166, as in the case of the release of the hook 159 from said part 146 as described in connection with the return of the carriage 124. Duplicate detail illustration of these carriage return parts appears unnecessary since they are sufficiently illustrated in connection with the carriage 124 in Fig. 6 and are diametrically illustrated in Fig. 27 as applied to any carriage with which they cooperate.

After the carriage 172 has been returned to its starting position, the carriage 172' with the cutter mechanism mounted therein is operated in the same way as the carriage 172, said carriage 172' being moved along the rails 174' from and to its starting position by analogues of the devices described for moving the carriage 172 from and to its starting position by that jack which presents a wood heel blank to the cutter 191 and then to a similar cutter in the carriage 172'. The cutter in the carriage 172' is at the opposite side of the machine from the cutter 191 and operates on the opposite corner portion of the wood heel to spool said opposite corner of the heel symmetrically with the wall 171.

After leaving the cutter 191, the wood heel is shifted and presented for operation of the cutter in the carriage 172'. This shifting is effected by passing one of the rollers 14 through the space between the cams 25 and 26 to the high point of the cam 26 (Fig. 33), the roller in advance passing against the end of the cam 27 and again turning the jack shaft 12, and causing the other roller to pass through the space between the cams 26 and 27 to the opposite side of said cam 27. During these turning movements of the jack shaft 12, the carriage 172' is moved along with the jack, causing the cutter in said carriage 172' to operate to complete the symmetrical formation of the spool wall 171 of the heel in accordance with the formation of the first wall 171 that had been formed by the cutter 191.

The carriage 172' is moved from and to its starting position by devices similar to the devices whereby the carriages 124, 124' and 172 are operated from and to their starting positions.

*Severing the top end portion of and discharging the heel*

After the spool surfaces 171 have been formed, the top end portion of the heel blank is severed and the approximately finished wood heel is then released and discharged from the jack. Passing from the cam 27, one of the rollers 14 engages the end of the cam 28 and is caused to pass through the space between the cams 27 and 28 to the opposite side of the cam 28, which is the same side along which the other roller 14 is operating (Fig. 33). The wood heel blank is then engaged by a pair of spaced fingers 196 and 197 and held and clamped thereby upon the supporting plate 30 while the clamping member 40 is released from the heel blank to permit free operation of the severing tool and is held released to permit the wood heel to be discharged from the jack. These fingers 196 and 197 are keyed for relative sliding movements on a sleeve 198 (Fig. 32), which sleeve is mounted for sliding movements along a shaft 199. A spring 200 encircles the sleeve 198 between the fingers 196 and 197 and holds said fingers spaced apart and against abutment nuts 201 screwed on the sleeve 198. The sleeve 198 is a part of a frame including a bail 202 having its ends attached to the ends of the sleeve 198. The bail 202 is also mounted for sliding movements along the shaft 203 which is parallel with the shaft 199, so that said shafts 199 and 203 constitute a support and guide for the frame of which the bail 202 is a part. A spring 204

(Figs. 30 and 31) mounted on the shaft 203 yieldingly holds the frame bail 202 and thereby the fingers 196 and 197 in a starting position.

The finger 196 has an elongation 205 extending into a cam slot 206 formed in a plate 207 rigidly attached to the frame 2. In the starting position of the fingers 196 and 197, the extension 205 is the low part of the cam slot 206 and thereby holds the fingers 196 and 197 elevated and out of the path of movement of the wood heel blank mounted on the moving jack.

A hook 208 is pivoted to the bail 202 (Figs. 25, 29 and 30) and is quite similar to the hooks 159 having a laterally extended pin 209 adapted to engage a cam 210 and thereby disengage the hook 208 from the jack part 46. During travel of the jack, one of the jack parts 46 engages this hook 208 and thereby moves the same along with the jack, also moving the fingers 196 and 197 along with the jack. The extension 205 is operated by the walls of the cam slot 206 to depress the two fingers 196 and 197 and clamp them firmly upon and against the curved outer wall of the heel that is mounted in the jack, thereby securely holding the heel upon the plate 30 with the projections 35 embedded in the heel. While the heel is thus held clamped on the plate 30 by the fingers 196 and 197, the jack member 37 is moved upwardly to release the clamping member 40 (Fig. 23) from clamping engagement with the heel.

When the fingers 196 and 197 have firmly clamped the heel, the jack members 46 move upwardly on cams 211, which are like the cams 48, and thereby raising the jack member 37 to disengage the clamping member 40 from the heel blank, leaving the heel blank engaged and clamped upon the plate 30 by said fingers 196 and 197 ready for operation of the severing tool.

The severing tool comprises a cutter 212 (Figs. 2 and 4) attached to and rotated by the shaft of a motor 213. The motor 213 is secured to a bracket 214 vertically adjustable on a vertical post 215. The post 215 is rigidly attached to and projects upwardly from a slide 216 supported for inward and outward sliding movements in a guide 217 (Figs. 2, 4, 29 and 30). A rod 218 is mounted for longitudinal movements in a support 219 and has its inner end attached to the slide 216. A spring 220 is mounted on the rod 218 between the support 219 and the head of the rod and is effective to move the slide 216 outwardly.

A cam lever 221 is mounted on a pivot 222 and extends inwardly so as to be engaged and operated by the jack member 105 during movement of the jack. A link 223 has one end pivotally connected with the slide 216 and the opposite end pivotally connected with the cam lever 221, so that when said cam lever is operated by said jack member 105, the slide 216 will be moved inwardly and will carry the tool 212 inwardly and cause said tool to sever the upper portion of the heel blank while the clamping member 40 is held out of engagement with the heel blank and while the heel blank is held upon the plate 30 by the fingers 196 and 197.

Next the fingers 196 and 197 are disengaged from the heel blank and the heel blank is ejected from the jack and conveyed from the machine. The fingers 196 and 197 are disengaged from the heel blank by the extension 205 passing into a descending part of the cam slot 206 (Fig. 31), thereby raising said fingers 196 and 197 out of engagement with the heel.

When the jack member 105 passes beyond the cam lever 221, the slide 216 is moved outwardly by operation of the spring 220 in cooperation with a spring 224 that connects the cam lever 221 with a stationary part of the machine.

A chute 225 has its outer portion supported by a pivoted bail 226 and its inner portion supported by links 227 having their upper ends pivoted to a frame 228 and their lower ends pivoted to said chute. A cam lever 229 is mounted on a pivot 230 and extends inwardly to position to be engaged and operated by one of the jack members 44 during movement of the jack and after the jack member 105 has passed out of engagement with the cam lever 221. A link 231 has one end pivoted to the cam lever 229 and the opposite end pivoted to the chute 225, so that when said cam lever 229 is operated by the jack member 44, the chute 225 will be moved inwardly and the inner end of said chute will be raised by the links 227 just when the edge portion of the heel blank is in position to be engaged and lifted by the inner end of the chute 225. This operation of the chute 225 occurs while the clamping member 40 is held out of engagement with the heel blank and the raising of the inner end of the chute 225 disengages the heel blank from the projections 35, so that the heel blank may easily be ejected from the jack and discharged onto the chute 225.

About the time that the heel blank is thus disengaged from the projections 35 by operation of the chute 225, the ejecting device is operated to discharge the heel blank from the jack onto the chute 225. A rod 232 is mounted for sliding movements in supports 233 and 234 and is actuated outwardly by a spring 235 mounted on said rod and between the support 233 and the head of the rod (Figs. 29 and 30). An arm 236 is supported by the inner end of the rod 232 and is operated to discharge the heel blank from the jack onto the chute 225.

A bell crank lever 237 is mounted on a pivot 238 and has one end connected by a pivot 239 with the rod 232 and its opposite end extending inwardly in position to be engaged and operated by one of the jack members 46 while the clamping member 40 is held out of engagement with the heel blank, the top end portion of which had been severed at about the time that the chute 225 disengages the heel blank from the projections 35. This operation of the lever 237 slides the rod 232 inwardly, causing the arm 236 to engage and push the heel blank from the jack and discharge the heel blank onto the chute 225, whereby the heel blank is conveyed or discharged from the machine. Continued forward movement of the jack moves the members 46 beyond and out of engagement with the cams 211, permitting the spring 42 to move the jack member 37 downwardly.

After the fingers 196 and 197 have been disengaged from the heel blank to permit the ejector to discharge the heel blank from the jack, the projection 209 engages the cam 210 and thereby disengages the hook 208 from the jack member 46, whereupon the spring 204 expands and moves the frame for the fingers 196 and 197 to its starting position ready for another operation.

A spring 240 (Fig. 29), connecting the cam lever 229 with a stationary part of the machine, operates to restore said cam lever to its unoperated position after the jack member 44 passes beyond and out of engagement with said cam lever 229.

Preventing vibration of heel blank during shaping operations

Each of the carriages 124, 124', 172 and 172' has side members like the side members 169 of the carriage 124 operating against fixed parts of the frames 1 and 2 and cooperating with the remaining supporting structure of said carriages to prevent improper vibration and oscillation of said carriages. And each of said carriages has a pair of spaced members 241 (Figs. 10 and 11) between which the extended portion 39 of the jack member 37 passes during forward movement of the jack member while said carriages remain stationary. Then when said carriages are moved along with the jack in the manner described, the extended portion 39 remains engaged between the spaced members 241, thereby preventing oscillation of the jack member with respect to said carriages and the cutters mounted therein, so that the heels will be cut and formed symmetrically and uniformly. This engagement of the jack member 39 between the spaced members 241 does not interfere with the turning of the jack shaft 12 but does cooperate with the bearings of said jack shaft to prevent oscillation and vibration of said shaft and of the heel blank supported thereby.

When these carriages are released from the jack in the manner herein described and are moved toward their starting positions, the continued movement of the jack carries the extended portion 39 thereof beyond and out of engagement with the carriage members 241.

Alternative carriage structures and cutter controls

As compared with the carriages 124, 124', 172 and 172', an alternative carriage construction and also an alternative cutter control are shown in Figs. 36 to 39, inclusive. The carriage 242 has rollers 243 operating along rails 244. A support 245 is mounted for sliding movements in a guide 246 connected with the carriage 242 and supports a roller 247 operating along the upper side of a rail 248, against the under side of which a roller 249 supported by the carriage 242 operates. Thus, the position of the support 245 is controlled by the formation of the upper surface of the rail 248. A rod 250 is carried by the support 245 and has its lower end attached to a frame 251. The side members of the frame 251 are formed with guides 252 receiving supporting extensions 253 of a horizontally movable member 254. The frame 254 is connected with the inner end of a rod 255 having its outer end attached to a member 256 supported for sliding movements in the frame 251. A spring 257 mounted on the rod 255 between the frames 251 and 254 yieldingly holds the frame 254 in its inward position. A cam bar 258 is engaged between rollers 259 supported by the frame 251 and a roller 260 supported by the member 256. Accordingly, the member 256 will be moved outwardly with respect to the frame 251 by the formation of the cam bar 258 and will be moved inwardly by the spring 257.

A supporting member 261 has curved flanges 262 mounted in curved guides 263 in the frame 254. Thus, the member 261 is supported for sliding movements along the curved guides 263. The frame of a motor 264 has a part 265 mounted on a pivot 266 carried by the member 261, swinging movements of the motor frame being limited by pin and slot devices 267. A bracket portion 268 is formed rigid with the motor frame part 265 and supports a roller 269 riding upon a cam 270, which is vertically adjustable by supports 271. A projection 272 from the motor frame part 265 is engaged by adjustable abutment screws 273 carried by the member 261, so that the motor may be adjusted and supported in any desired adjustments about the pivot 266. A cutter 274 is attached to and rotated by the motor shaft 275 and corresponds to the cutter 143 or to its analogue.

The carriage 242 is moved from and to its starting position by the jack by means of the same equipment whereby the carriages 124, 124', 172 and 172' are moved from and to their starting positions, duplicating illustration of such equipment being omitted.

The cams 258 and 270 are of coordinated and cooperating formation, so that the cutter 274 will be moved inwardly and outwardly and to different angles of inclination as required to form heels of the desired type. By varying these cams and by varying the position of the cam 270, heels of numerous different types, forms and configurations may be formed. In any of these adjustments, irrespective of the inclination of the axis of the motor and cutter shaft 265, the edges of the rotating cutters 274 pass a definite point, such as the point 276, although the cutters form the heels 277 of any of the various forms, shapes and configurations.

In this alternative carriage structure and mounting therefor, the rails 244 are horizontal and are not inclined as are the rails 126 and 126'. Here, vertical movement of the cutter is caused and controlled by the shape or inclination of the rail 248 because the frame 251 is vertically movable in the carriage 242 and will be moved vertically in accordance with the shape or inclination of said rail 248.

Tilting or inclination of the axis of the cutter 274 in this alternative construction is effected and controlled by the cam bar 270. This cam bar 270 is formed so that the edge of the cutter or tool 274 always intersects and pivots about a point 276, which is at the edge of the heel seat of the heel 277. The cam bar 258 constitutes a rail or guide controlling and regulating the position of the cutter tool 274 laterally with respect to the longitudinal axis of the heel 277, which is in continuation of the axis of the jack shaft 12. Therefore, the area of the heel seats of the heels 277 may be varied by adjusting and holding the cam bar 258 in selected positions. And the size of the heel may be varied considerably by adjustment of the cam bar 270. Therefore, this construction is an embodiment of means whereby the same tool or cutter 274 may be used and operated to form heels of different sizes without removing or replacing any of the parts or substituting others therefor but by merely changing the position of the cam bar 270.

This carriage 242 is provided with members 278 for engaging the jack member 39 to prevent oscillation of the heel blank while the heel is being formed.

Still another mounting for the cutter is illustrated in Fig. 44. The motor carriage 279 has its rollers 280 operating on rails 281. A frame 282 is mounted for vertical movements in the carriage 279, being supported by rollers 283 operating on a cam 284 which is vertically adjustable by means of supports 285. A frame 286 is supported for inward and outward sliding movements in the frame 282 by projections extending into guides 287 in said frame 282. The frame of a motor 288 has curved flanges 289 extending laterally therefrom into curved guides 290 in the frame 286.

A link 291 is pivotally connected with the frame 286 and with a frame 292 supported for sliding movements by guides 293 formed on the carriage 279. A cam 294 extends through the frame 292 and is effective to slide said frame 292 inwardly or outwardly and thereby move the frame 286. A link 295 pivotally connects the frame of the motor 288 with a frame 296 mounted for sliding movements along a cam 297 and will thereby move the motor to different angles of inclination. These cams 294 and 297 are coordinated and cooperate to control the inward and outward movements of the motor and the tilting of the motor as required to support the motor shaft 298 and the cutter 299 supported by said shaft in different angles of inclination for operation upon the heel 300.

In this alternative carriage construction and mounting, inward and outward movement of the tool or cutter 299 in order to cut symmetrically about the axis of the heel, which is in continuation of the axis of the jack shaft 12, is controlled and effected by the cam 294 while vertical movements of the cutter or tool 299 to cut on the reverse spiral, as heretofore mentioned, is effected and controlled by the cam 284 and pivotal movement of the cutter about the center 301 is effected by and controlled by the cam 297 coordinated and cooperating with the cam 284 and the cam 294. The rails 281 are horizontal and are not inclined, all of the movements of the carriage and cutter being controlled by the cams 284, 294 and 297.

Spaced members 302 supported by the carriage 279 engage the jack member 39 and hold the same from vibration and oscillation during the time that the cutter 299 is operating on the heel blank 300.

The carriage 299 is moved from and to its starting position by equipment like the equipment whereby the carriages 124, 124', 172 and 172' are moved from and to their starting positions, and duplicating illustration of this equipment is omitted.

*Preventing the jacks from oscillating and cleaning the rails*

The jacks are held from substantial oscillation by the arrangement and operation of the rollers 10 along the rails 11. In the specific arrangement shown, there are three rollers 10 at each side of the jack carriage, two of said rollers operating along the lower portion of the rails 11 and the intermediate roller operating against the upper portions of said rails, which are in the form of channels. This construction and arrangement holds the jacks from substantial vibration during their travel and during operation of the cutters or tools on the work.

In Fig. 24, a different arrangement for preventing vibration of the jack carriages is shown. Instead of the triangular arrangement of the rollers 10, the jack carriage has attached thereto members 303 designed and arranged to engage and slide along the rails 11 and thus cooperate with the rollers 10 to hold the jack carriages from oscillation. Specifically the members 303 have inclined or beveled surfaces engaging and operating against matching surfaces on the rails 11. These members 303 may be secured in adjusted positions by holding members 304.

Certain of the jack carriages 9 have laterally extended lugs 305 (Fig. 17) to which are attached spring members 306 having bent ends 307 adapted to scrape along the upper and lower surfaces of the channel rails 11 and thus loosen and remove deposits of wood shavings, chips, dust and the like from said rails and keep said rails clean. This facilitates the operation of the jacks.

Other jack carriages 9 have fibrous or other appropriate types of sweepers 308 attached to the projections 305 instead of the springs 306. These sweepers will sweep and discharge from the rails that portion of the materials loosened but not discharged by the springs 306.

*Assuring uniform uninterrupted movement of the jacks*

It is desirable that the upper portions of the conveyor chains 3 be held taut and be prevented from slackening and that uniform uninterrupted movement of the jacks be assured. This is desirable in order to prevent undesired variation in speed of movement of the jacks during the time that the respective cutting tools are operating upon the blanks.

In order to assure this uniform uninterrupted movement of the jacks, I have provided a device for holding the upper portions of the conveyor chains 3 taut and preventing said chains from slackening. An appropriate embodiment of this device comprises a brake drum 309 (Figs. 3 and 45 to 47) attached to the shaft 7 and in cooperative relation with a resilient band 310 having a brake shoe friction member 311 attached thereto for frictional engagement with the drum 309. One end of this band 310 is connected with a support 312. A rod 313 extends through the opposite end of the band 310 and a spring 314 is mounted around the rod and cooperates therewith as a resilient actuator for the band 310. The rod 313 is connected with a pivot 315. A pair of links 316 are pivoted at one end on the support 312 and have their opposite ends pivotally connected with adjacent ends of a pair of links 317 by the pivot 315. The opposite ends of the links 317 are connected with a pivot 318 mounted in a lever 319 supported by a pivot 320. A lever 321 is connected with the lever 319 for operating the same.

These devices are shown in their unoperated position in Fig. 45 and in their operated position in Fig. 46 to which they are moved by moving the lever 321 from its unoperated position (Fig. 45) to its operated position (Fig. 46). In the latter position, the pivot 315 is beyond dead center, which is the line between the axes of the parts 312 and 318 and the elastic actuator 314 yieldingly holds the band 310 in position in which the friction brake shoe member 311 frictionally engages the brake drum 309. Thus, rotation of the shaft 7, to which the sprocket wheels 6 are attached, is retarded with the result that the upper portions of the conveyor chains 3 are held stretched taut and are prevented from slackening and are required to move at a uniform uninterrupted rate of speed. I am aware that the form of this retarding device may be varied widely without departure from the invention.

The mode of operation of this machine should now be apparent. The cutting tool 66 may be used or not, as desired, in the formation of Louis heels and is preferably used in the operation of the machine to form the wall 109.

In using the machine to manufacture Cuban heels, the cutting tool 79 may be supported out of position for operation, so that after the Cuban heels pass from the cutting tool 66 they are next subjected to the action of the cutters 143 and 143'.

The types of tools used for forming the articles to be made may be varied and the machine may be used for the manufacture of numerous types of articles by mere mechanical adaptation and without departure from the nature and principle of the invention.

I claim:

1. In a machine of the character described, a tool operative to form one wall of an article, a rigid support for said tool, another tool operative to form a curved wall intersecting said first wall and also to form a wall surface differing in contour from said curved wall, a pivot supporting said second tool for swinging movements from and to a starting position, a continuously moving jack for supporting a blank from which the article is to be formed and for presenting portions of said blank to said tools successively during uninterrupted movement of said jack and said blank, and means for swinging said second tool about said pivot and also in an arc that is eccentric with respect to said pivot during uninterrupted movement of said jack adjacent to said second tool and while said second tool is operating on said blank.

2. In a machine of the character described, a tool operative to form one wall of an article, another tool operative to form a curved wall intersecting said first wall and also to form a wall surface differing in contour from said curved wall, a continuously moving jack for supporting a blank from which the article is to be formed and for presenting portions of said blank to said tools successively during uninterrupted movement of said jack and said blank, means for causing said first tool to form curved or straight walls on blanks presented thereto by said jack as desired, and means for moving said second tool in an arc during uninterrupted movement of said jack and said blank and during operation of said second tool on said blank and thereby causing said second tool to form said curved wall.

3. In a machine of the character described, a tool operative to form a curved wall and also to form a wall surface differing in contour from said curved wall and at an angle with respect to the axis of said curved wall, a continuously moving jack for supporting a blank from which an article is to be formed and for presenting a portion of said blank to said tool during uninterrupted movement of said jack and said blank, mechanism for operating said tool, and mechanism for moving said tool in an arc from a starting position of said tool and causing said tool to form said walls during such movement.

4. In a machine of the character described, a continuously moving jack for supporting a blank from which an article is to be formed, a tool operative to form on said blank a curved wall and also a wall surface differing in contour from said curved wall, mechanism for operating said tool, and means for moving said tool in an arc from a starting position of said tool during uninterrupted movement of said jack and while said tool is forming said walls.

5. In a machine of the character described, a continuously moving jack for supporting a blank from which an article is to be formed, a tool operative to form on said blank a curved wall and also a wall surface differing in contour from said curved wall, mechanism for operating said tool, means for moving said tool in an arc from a starting position during uninterrupted movement of said jack and while said tool is forming said walls, mechanism for returning said tool to said starting position, and another tool operative to form an additional wall surface on said blank after said blank has been moved from said first tool.

6. In a machine of the character described, a continuously moving jack for supporting a blank from which an article is to be formed, a tool operative to form on said blank a curved wall and also to form a wall surface differing in contour from said curved wall, and mechanism for moving said tool in an arc from a starting position of said tool during movement of said jack adjacent to said tool and causing said tool to operate on said blank during a portion of such movement from said starting position.

7. In a machine of the character described, a continuously moving jack for supporting a blank from which an article is to be formed, a tool operative to form on said blank a curved wall and also to form a wall surface differing in contour from said curved wall, mechanism for moving said tool in an arc from a starting position of said tool during movement of said jack adjacent to said tool and causing said tool to operate on said blank during a portion of such movement from said starting position, and means for controlling the length of the arc along which said tool will be moved as aforesaid.

8. In a machine of the character described, a continuously moving jack for supporting a blank from which an article is to be formed, a tool operative to form simultaneously on said blank a curved wall and a wall surface differing in contour from said curved wall, and mechanism for moving said tool in an arc from a starting position of said tool during movement of said jack adjacent to said tool and thereby causing said tool to operate on said blank to form said curved wall.

9. In a machine of the character described, a continuously moving jack for supporting a blank from which an article is to be formed, a tool operative to form simultaneously on said blank a curved wall and a wall surface differing in contour from said curved wall and at an angle with respect to said curved wall, and mechanism controlled by said jack for moving said tool in an arc from a starting position of said tool during movement of said jack adjacent to said tool and during operation of said tool on said blank.

10. In a machine of the character described, a continuously moving jack for supporting a blank from which an article is to be formed, a tool rotative about an axis to form on said blank a curved wall and also to form a wall surface differing in contour from said curved wall, mechanism for supporting said tool at different angles of inclination with respect to said blank, and mechanism for moving said tool in an arc from a starting position during continuous movement of said jack adjacent to said tool and causing said tool to operate on said blank during a portion of such movement.

11. In a machine of the character described, a continuously moving jack for supporting a blank from which an article is to be formed, a tool rotative about an axis to form on said blank a curved wall and also to form a wall surface differing in contour from said curved wall, mechanism for supporting said tool at different angles of inclination with respect to said blank, mechanism for moving said tool in an arc from a starting position during continuous movement of said jack adjacent to said tool and causing said tool 12. In a machine of the character described, a continuously moving jack for supporting a blank from which an article is to be formed, a tool operative to form a wall at one side of said blank and a curved wall extending laterally from merger with said first wall, and mechanism for moving said tool in an arc from a starting position of said tool during movement of said jack adjacent to said tool and causing said tool to operate on said blank to form said walls during movement of said tool.

13. In a machine of the character described, a continuously moving jack for supporting a blank from which an article is to be formed, a rotary tool operative to form on said blank simultaneously a curved wall and a wall surface differing in contour from said curved wall, mechanism for rotating said tool, and mechanism for moving said tool in an arcuate line from a starting position of said tool during movement of said jack adjacent to said tool and during rotation of said tool to cause said tool to form said wall and said wall surface.

14. In a machine of the character described, a rotary jack shaft for supporting a blank from which an article is to be formed, mechanism for moving said shaft continuously and uninterruptedly at right angles to its axis, a support mounted on a pivot at one end of and at right angles to the axis of said shaft, devices for holding said support in selected angles of inclination with respect to the axis of said shaft, a cutting tool for operating on the blank mounted on said support, mechanism for operating said cutting tool, and means operated by said first named mechanism for moving said cutting tool laterally from a starting position and in the general direction of movement of said shaft during a part of the time that said cutting tool operates on said blank.

15. In a machine of the character described, a rotary jack shaft for supporting a blank from which an article is to be formed, mechanism for moving said shaft continuously and uninterruptedly at right angles to its axis, a support mounted on a pivot at one end of and at right angles to the axis of said shaft, devices for holding said support in selected angles of inclination with respect to the axis of said shaft, a cutting tool for operating on the blank mounted on said support, mechanism for operating said cutting tool, means operated by said first named mechanism for moving said cutting tool laterally from a starting position and in the general direction of movement of said shaft during a part of the time that said cutting tool operates on said blank, and means for turning said shaft about its axis to present different portions of the blank to said cutting tool during such movement of said shaft and said tool.

16. In a machine of the character described, a continuously moving jack for supporting a blank from which an article is to be formed, a rotary and laterally movable cutting tool for operating on said blank, mechanism for rotating said cutting tool, and mechanism for moving said cutting tool laterally from a starting position in the general direction of movement of said jack and at slower speed than the movement of said jack during operation of said cutting tool on said blank.

17. In a machine of the character described, a continuously moving jack for supporting a blank from which an article is to be formed, a rotary and laterally movable cutting tool for operating on said blank, mechanism for rotating said cutting tool, and mechanism for moving said cutting tool laterally from a starting position at slower speed than said jack and gradually increasing said speed of lateral movement of said cutting tool during operation of said cutting tool on said blank.

18. In a machine of the character described, a continuously moving jack for supporting a blank from which an article is to be formed, a rotary cutting tool operative to form simultaneously on said blank a curved wall and a wall surface differing in contour from said curved wall, and mechanism for moving said tool in an arcuate line from a starting position of said tool during movement of said jack adjacent to said tool and while said tool is forming said curved wall and said wall surface.

19. In a machine of the character described, a continuously moving jack for supporting a blank from which an article is to be formed, a rotary cutting tool operative to form simultaneously on said blank a curved wall and a wall surface differing in contour from said curved wall, mechanism for moving said tool in an arcuate line from a starting position of said tool during movement of said jack adjacent to said tool and while said tool is forming said curved wall and said wall surface, and mechanism for returning said cutting tool to its starting position after said cutting tool has formed said curved wall and said wall surface on said blank.

20. In a machine of the character described, a continuously moving jack for supporting a blank from which an article is to be formed, a rotary cutting tool operative to form simultaneously on said blank a curved wall and a wall surface differing in contour from said curved wall, mechanism for moving said tool in an arcuate line from a starting position during movement of said jack adjacent to said tool and while said tool is forming said curved wall and said wall surface, mechanism for returning said cutting tool to its starting position after said cutting tool has formed said curved wall and said wall surface on said blank, and means for varying the radius of curvature of the arcuate line along which said cutting tool is moved.

21. In a machine of the character described, a continuously moving jack for supporting a blank from which an article is to be formed, a rotary cutting tool operative to form simultaneously on said blank a curved wall and a wall surface differing in contour from said curved wall, mechanism for moving said tool in an arcuate line from a starting position during movement of said jack adjacent to said tool and while said tool is forming said curved wall and said wall surface, mechanism for returning said cutting tool to its starting position after said cutting tool has formed said curved wall and said wall surface on said blank, and means for varying the angle of inclination of the axis of rotation of said cutting tool with respect to said blank.

22. In a machine of the character described, a continuously moving jack for supporting a blank from which an article is to be formed, a tool operative to form on said blank a curved wall surface, mechanism for rotating said tool about an axis, and means for moving said tool at gradually increasing speed in the general direction of movement of said jack during movement of said jack adjacent to said tool and while said tool is operating on the blank supported by said jack.

23. In a machine of the character described, a continuously moving jack for supporting a blank from which an article is to be formed, a tool operative to form on said blank a curved wall surface, mechanism for rotating said tool about an axis, means for moving said tool at gradually increasing speed in the general direction of movement of said jack during movement of said jack adjacent to said tool and while said tool is operating on the blank supported by said jack, and means for varying the angle of inclination of the axis of rotation of said tool with respect to said blank during said lateral movement of said tool and while said tool is operating on said blank.

24. In a machine of the character described, a continuously moving jack for supporting a blank from which an article is to be formed, a tool operative to form on said blank a curved wall surface, mechanism for rotating said tool about an axis, means for moving said tool at gradually increasing speed in the general direction of movement of said jack during movement of said jack adjacent to said tool and while said tool is operating on the blank supported by said jack, means for varying the angle of inclination of the axis of rotation of said tool with respect to said blank during said lateral movement of said tool and while said tool is operating on said blank, and means for moving said tool in the direction of the longitudinal axis of said blank during operation of said tool on said blank.

25. In a machine of the character described, a continuously moving jack for supporting a blank from which an article is to be formed, a tool operative to form on said blank a curved wall surface, mechanism for rotating said tool about an axis, means for moving said tool at gradually increasing speed in the general direction of movement of said jack during movement of said jack adjacent to said tool and while said tool is operating on the blank supported by said jack, means for varying the angle of inclination of the axis of rotation of said tool with respect to said blank during said lateral movement of said tool and while said tool is operating on said blank, means for moving said tool in the direction of the longitudinal axis of said blank during operation of said tool on said blank, and means for turning said blank to present different parts thereof to said tool during said movements of said tool and while said tool is operating on said blank.

26. In a machine of the character described, an endless conveyor device, a jack connected with and operated by said conveyor device, mechanism for continuously moving said conveyor device, means for supporting a blank by said jack, working tools for operating on said blank and controlled by said jack, and means for preventing slackening of said conveyor device and preventing variation in the rate of speed of said jack.

27. In a machine of the character described, a continuously moving jack for supporting a blank from which an article is to be formed, tools for working on said blank, and mechanisms for operating said tools and for moving said tools in synchronism with the movement of said jack and at gradually increasing speed from the beginning of the movement of said tools.

28. In a machine of the character described, a continuously moving jack for supporting a blank from which an article is to be formed, a continuously operating tool movable from and to a starting position while operating, and mechanism for moving said jack continuously and at approximately uniform speed and moving said tool from said starting position at gradually increasing speed and causing said tool to operate on said blank during a portion of such movement.

29. In a machine of the character described, a continuously moving jack for supporting a blank from which an article is to be formed, a continuously operating tool movable from and to a starting position while operating, mechanism for moving said jack continuously and at approximately uniform speed and moving said tool from said starting position at gradually increasing speed and causing said tool to operate on said blank during a portion of such movement, and mechanism for returning said tool to said starting position for operation on an additional blank.

30. In a machine of the character described, a continuously moving jack for supporting a blank from which an article is to be formed, a tool for working on said blank to form a portion of the surface of the article, and mechanisms for operating said tool and for moving said tool in the arc of a circle in synchronism with the movement of said jack.

31. In a machine of the character described, a continuously moving jack for supporting a blank from which an article is to be formed, a tool for working on said blank to form a portion of the surface of the article, and mechanisms for operating said tool and moving said tool in the arc of a circle from a starting position of said tool in synchronism with the movement of said jack while said tool is working on said blank.

32. In a machine of the character described, a continuously moving jack for supporting a blank from which an article is to be formed, mechanism for placing a blank on said jack during movement of said jack, a continuously operating pivotally supported tool for working on said blank, and mechanisms for continuously operating said tool and during such operation moving said tool in an arcuate line from a starting position in synchronism with the movement of said jack and causing said tool to work on said blank during a portion of such movement.

33. In a machine of the character described, a continuously moving jack for supporting a blank from which an article is to be formed, mechanism for placing a blank on said jack during movement of said jack, a continuously operating pivotally supported tool for working on said blank, mechanisms for continuously operating said tool and during such operation moving said tool in an arcuate line from a starting position in synchronism with the movement of said jack and causing said tool to work on said blank during a portion of such movement, and means for returning said tool to its starting position preparatory for another operation.

34. In a machine of the character described, a continuously moving jack for supporting a blank from which an article is to be formed, mechanisms for placing a blank on and subsequently removing the article from said jack, a continuously operating tool, and mechanism for moving said tool in an arcuate line from a starting position in synchronism with the movement of said jack and causing said tool to work on said blank during a portion of such movement.

35. In a machine of the character described, a continuously moving jack for supporting a blank from which an article is to be formed, mechanisms for placing a blank on and subsequently removing the article from said jack, a continuously operating tool, mechanism for moving said tool in an arcuate line from a starting position in synchronism with the movement of said jack and causing said tool to work on said blank during a portion of such movement, and means for returning said tool to said starting position after said tool has worked on said blank as aforesaid.

36. In a machine of the character described, a continuously moving jack for supporting a blank from which an article is to be formed, a tool for working on said blank, and mechanism for operating said tool in a descending and ascending spiral movement in synchronism with the movement of said jack.

37. In a machine of the character described, a continuously moving jack for supporting a blank from which an article is to be formed, a continuously operating tool for working on said blank, and mechanisms for operating said tool and for moving said tool in a descending and ascending spiral line in synchronism with the movement of said jack.

38. In a machine of the character described, a continuously moving jack for supporting a blank from which an article is to be formed, a continuously operating tool for working on said blank, mechanisms for operating said tool and for moving said tool in a descending and ascending spiral line in synchronism with the movement of said jack, and means for ejecting the article from said jack after the article has been formed.

39. In a machine of the character described, a continuously moving jack for supporting a blank from which an article is to be formed, a tool operative to form on said blank a curved wall and a wall surface differing in contour from said curved wall, mechanism for moving said tool in an arcuate line from a starting position during movement of said jack adjacent to said tool and causing said tool to form said wall and said wall surface during a portion of such movement, a cutting tool operative in a descending and ascending spiral course on another portion of said blank, and mechanism for ejecting the article from said jack after said tools have operated thereon.

40. In a machine of the character described, a continuously moving jack for supporting a blank from which an article is to be formed, a tool operative to form on said blank a curved wall and a wall surface differing in contour from said curved wall, and mechanisms for operating said tool and for moving said tool in an arcuate line from a starting position of said tool in synchronism with the movement of said jack and thereafter returning said tool to its starting position.

41. In a machine of the character described, a continuously moving jack for supporting a blank from which an article is to be formed, a tool operative to form on said blank a curved wall and a wall surface differing in contour from said curved wall, mechanisms for operating said tool and for moving said tool in an arcuate line from a starting position of said tool in synchronism with the movement of said jack and thereafter returning said tool to its starting position, and optional means for varying the radius of curvature of said arcuate line along which said tool is moved.

42. In a machine of the character described, a continuously moving jack for supporting a blank from which an article is to be formed, tools for forming a wall surface at one side of said blank, other tools for forming other wall surfaces on said blank, and mechanisms for operating and moving said other tools in reverse spiral courses during their operation on said blank.

43. In a machine of the character described, a continuously moving jack for supporting a blank from which an article is to be formed, tools for forming a wall surface at one side of said blank, other tools for forming other wall surfaces on said blank, mechanisms for operating and moving said other tools in reverse spiral courses during their operation on said blank, and means for ejecting the article from said jack after completion of the work of said tools.

44. In a machine of the character described, a continuously moving jack for supporting a blank from which an article is to be formed, a series of tools for working on said blank, and mechanisms for operating certain of said tools in arcuate lines and other of said tools in spiral lines during their work on said blank.

45. In a machine of the character described, a continuously moving jack for supporting a blank from which an article is to be formed, tools for working successively on said blank, and mechanisms for operating and moving one of said tools in an arcuate line during its work on said blank and for moving other of said tools along spiral lines during their work on said blank and during continuous movement of said jack.

46. In a machine of the character described, a continuously moving jack for supporting a blank from which an article is to be formed, tools arranged to operate on said blank successively during movement of said blank, and mechanisms for operating said tools and for moving said tools in synchronism with the movement of said jack, one of said tools being moved along an arcuate line and others along spiral lines during their work on said blank.

ANDREW F. HOWE.